(12) United States Patent
Jeong et al.

(10) Patent No.: US 10,123,029 B2
(45) Date of Patent: Nov. 6, 2018

(54) METHOD AND APPARATUS FOR PROCESSING VIDEO

(71) Applicant: CHIPS & MEDIA, INC, Seoul (KR)

(72) Inventors: Wook Je Jeong, Gwacheon-si (KR); Min Yong Jeon, Seoul (KR); Dong Jin Park, Namyangju-si (KR)

(73) Assignee: CHIPS & MEDIA, INC, Seoul (KR)

( * ) Notice: Subject to any disclaimer, the term of this patent is extended or adjusted under 35 U.S.C. 154(b) by 428 days.

(21) Appl. No.: 14/841,321

(22) Filed: Aug. 31, 2015

(65) Prior Publication Data

US 2016/0057440 A1 Feb. 25, 2016

Related U.S. Application Data

(63) Continuation of application No. PCT/KR2013/007104, filed on Aug. 6, 2013.
(Continued)

(51) Int. Cl.
*H04N 19/44* (2014.01)
*H04N 19/172* (2014.01)
(Continued)

(52) U.S. Cl.
CPC .......... *H04N 19/44* (2014.11); *H04N 19/117* (2014.11); *H04N 19/124* (2014.11); *H04N 19/13* (2014.11);
(Continued)

(58) Field of Classification Search
None
See application file for complete search history.

(56) References Cited

U.S. PATENT DOCUMENTS 5,502,499 A 3/1996 Birch
5,973,740 A * 10/1999 Hrusecky ............ H04N 5/4401
348/E11.021

(Continued)

FOREIGN PATENT DOCUMENTS

CN 001820504 A 8/2006
CN 101777366 A 7/2010
(Continued)

*Primary Examiner* — Kate H Luo
(74) *Attorney, Agent, or Firm* — Novick, Kim & Lee, PLLC; Sang Ho Lee

(57) ABSTRACT

Provided is an apparatus for processing a video. The apparatus for processing a video includes an image receiving module that is configured to receive encoded data, a filtering module that is configured to filter an image frame reconstructed from the encoded image, a block dividing module to divide the filtered image frame into a predetermined block dividing unit, a compression module to compress each of the plurality of blocks, to package the compressed plurality of blocks into a predetermined packaging unit, and to generate lookup table information corresponding to each of the packaged block, a frame buffer memory that is configured to record the packaged data, a first decompression module that is configured to perform first decompression of one or more of the recorded blocks corresponding to a particular frame for motion compensating by using the lookup table information, and a converter that is configured to decompress the recorded blocks to output sequentially by using the lookup table information.

14 Claims, 18 Drawing Sheets

Related U.S. Application Data

(60) Provisional application No. 61/807,663, filed on Apr. 2, 2013.

(51) Int. Cl.

| | | |
|---|---|---|
| *H04N 19/117* | (2014.01) | |
| *H04N 19/176* | (2014.01) | |
| *H04N 19/61* | (2014.01) | |
| *H04N 19/426* | (2014.01) | |
| *H04N 19/573* | (2014.01) | |
| *H04N 19/58* | (2014.01) | |
| *H04N 19/13* | (2014.01) | |
| *H04N 19/18* | (2014.01) | |
| *H04N 19/124* | (2014.01) | |
| *H04N 19/433* | (2014.01) | |

(52) U.S. Cl.
 CPC ......... *H04N 19/172* (2014.11); *H04N 19/176* (2014.11); *H04N 19/18* (2014.11); *H04N 19/428* (2014.11); *H04N 19/433* (2014.11); *H04N 19/573* (2014.11); *H04N 19/58* (2014.11); *H04N 19/61* (2014.11)

(56) References Cited

U.S. PATENT DOCUMENTS

| | | | | |
|---|---|---|---|---|
| 6,115,496 | A | 9/2000 | Nguyen | |
| 6,151,660 | A * | 11/2000 | Aoki | .................. G06F 12/0866 |
| | | | | 711/129 |
| 6,799,246 | B1 * | 9/2004 | Wise | .................. G06F 12/0207 |
| | | | | 710/53 |
| 7,333,545 | B2 * | 2/2008 | Duruoz | .................. H04N 7/01 |
| | | | | 348/E7.003 |
| 7,403,487 | B1 | 7/2008 | Foladare | |
| 2003/0138045 | A1 * | 7/2003 | Murdock | ............... H04N 19/44 |
| | | | | 375/240.12 |
| 2005/0232501 | A1 | 10/2005 | Mukerjee | |
| 2007/0046698 | A1 * | 3/2007 | Nam | ......................... G06F 3/14 |
| | | | | 345/660 |
| 2008/0285652 | A1 * | 11/2008 | Oxman | ................... H04N 19/61 |
| | | | | 375/240.16 |
| 2010/0053357 | A1 | 3/2010 | Ikeda | |
| 2011/0002396 | A1 * | 1/2011 | Ivanov | ................. H04N 19/105 |
| | | | | 375/240.24 |
| 2011/0206289 | A1 | 8/2011 | Dikbas | |
| 2012/0230423 | A1 * | 9/2012 | Esenlik | .............. H04N 19/0089 |
| | | | | 375/240.24 |
| 2012/0320067 | A1 | 12/2012 | Iourcha | |
| 2013/0022104 | A1 * | 1/2013 | Chen | ...................... H04N 19/70 |
| | | | | 375/240.02 |

FOREIGN PATENT DOCUMENTS

| | | |
|---|---|---|
| CN | 101971633 A | 2/2011 |
| CN | 102948149 A | 2/2013 |
| JP | 06-334916 A | 12/1994 |
| JP | 09-093425 A | 4/1997 |
| JP | 2001-022553 A | 1/2001 |
| JP | 2003-348592 A | 12/2003 |
| JP | 2012-199608 A | 10/2012 |
| KR | 10-1994-0003388 A | 2/1994 |
| KR | 102005-0015616 A | 2/2005 |
| KR | 10-2008-0046345 A | 5/2008 |
| KR | 10-20100003167 A | 1/2010 |
| KR | 10-2010-0117107 A | 11/2010 |
| KR | 10-20110047697 A | 5/2011 |
| KR | 10-2012-0120091 A | 11/2012 |

* cited by examiner

| BW Saving : 60.70% | | qp 22 : 58.75% | | qp 27 : 60.17% | | qp 32 : 61.30% | | qp 37 : 62.56% | |
|---|---|---|---|---|---|---|---|---|---|
| BW (Mbyte/sec) | 30frame | PureBW | Comp | PureBW | Comp | PureBW | Comp | PureBW | Comp |
| 4K 30fps | 405.70 | 2,108.42 | 1,106.68 | 1,937.94 | 973.51 | 1,790.27 | 849.86 | 1,596.94 | 715.39 |
| FHD 30fps | 89.65 | 477.82 | 182.88 | 407.88 | 152.48 | 370.59 | 137.49 | 350.26 | 126.48 |
| Conference 720p 60fps | 79.10 | 306.85 | 107.69 | 281.03 | 94.50 | 269.62 | 89.42 | 257.67 | 83.20 |
| Screen 720p 30fps | 39.55 | 100.11 | 39.17 | 98.21 | 37.40 | 95.91 | 35.55 | 94.46 | 34.54 |

| BW Saving : 32.22% | | qp 22 : 32.93% | | qp 27 : 32.33% | | qp 32 : 31.94% | | qp 37 : 31.67% | |
|---|---|---|---|---|---|---|---|---|---|
| BW (Mbyte/sec) | 30frame | PureBW | Comp | PureBW | Comp | PureBW | Comp | PureBW | Comp |
| 4K 30fps | 405.70 | 2,108.42 | 1,512.38 | 1,937.94 | 1,379.22 | 1,790.27 | 1,255.57 | 1,596.94 | 1,121.09 |
| FHD 30fps | 89.65 | 477.82 | 272.53 | 407.88 | 242.13 | 370.59 | 227.14 | 350.26 | 216.13 |
| Conference 720p 60fps | 79.10 | 306.85 | 186.79 | 281.03 | 173.60 | 269.62 | 168.52 | 257.67 | 162.30 |
| Screen 720p 30fps | 39.55 | 100.11 | 78.72 | 98.21 | 76.95 | 95.91 | 75.11 | 94.46 | 74.09 |

METHOD AND APPARATUS FOR PROCESSING VIDEO

TECHNICAL FIELD

The present invention relates to a method and apparatus for processing a video, and more particularly, a method and apparatus for processing a video, capable of improving bandwidth efficiency of a frame buffer memory.

BACKGROUND ART

The present invention results from a research, which has been carried out as a part of work which was supported by the Technology Innovation Program (10049498, 4K UHD HEVC/VP9 SoC for Streaming Smart Device) funded by the Ministry of Trade, Industry and Energy (MOTIE, KOREA).

Recent improvement of video processing algorithms allows a video processing apparatus to process much larger-scale images.

Specifically, with need for ultrahigh definition (UHD), existing video compression techniques have difficulty in accommodating sizes of storage media and bandwidths of transfer media. Accordingly, a novel standard for compression of UHD video is needed. As a result, high efficiency video coding (HEVC) has completely been standardized on January in 2013. The HEVC may be available for a video stream serviced through networks, such as the Internet, 3G, long term evaluation (LTE), etc, in which not only UHD but also full high definition (FHD) or high definition (HD) videos can be compressed in accordance with HEVC.

A UHD TV is considered to mainly provide 4K (4096× 2304 pixels) UHD at 30 frames per second (fps) in the short term, while the number of pixels to be processed per second is expected to continuously increase to 4K 60 fps/120 fps, 8K 30 fps/60 fps, and the like. A bandwidth on demand per frame for a bidirectional frame prediction and filtering is expected to remarkably increase as well.

To deal with the increase in the processing bandwidths, a transmission bandwidth between system modules or to the exterior should also be improved based on performance or functions required for applications.

However, unlike the remarkable increase in the required processing bandwidth in response to an increase in image resolutions to be processed and frame rates, a bandwidth for transmission thereof is limited.

For example, a bandwidth for storing an image in a frame buffer memory or extracting the image from the frame buffer memory may be limited according to a minimum burst length of a memory application.

To overcome this problem, a method of compressing images which are input and/or output in/out the frame buffer memory is taken into account, but fails to provide a remarkable bandwidth reduction effect.

Also, current frame buffer compression techniques are using a loss compression algorithm for obtaining high compression efficiency. However, the loss compression algorithm brings about a gradual decrease of quality and a change of a compression data format.

Due to the format change, a process of searching for a frame buffer memory for random access is made complicated, thereby increasing a throughput and a processing time again.

DISCLOSURE

Technical Problem

The present invention has been made keeping in mind the drawbacks of the related art, and an object of the invention is to provide a video processing apparatus and method, capable of improving bandwidth efficiency even without degradation of quality, by use of lossless compression of a frame buffer.

Another aspect of the invention is to provide a video processing apparatus and method, which enables fast processing by providing a compression format of a frame buffer which is easy to access while maintaining a lossless state.

Also, another aspect of the invention is to provide a video processing apparatus and method, which enables maximizing effects of reducing bandwidth by diversifying compression methods for lossless compression of a frame buffer.

Moreover, another aspect of the invention is to provide a video processing apparatus and method, which enables improving a compression efficiency by processing block dividing efficiently for frame buffer compression.

And another aspect of the invention is to provide a video processing apparatus and method, which maintains effects of reducing bandwidth during decompressing and easy to access to memory for decompressing.

Technical Solution

In order to achieve the above object, there is provided an apparatus for processing a video according to one embodiment disclosed herein, the apparatus including an image receiving module to receive an encoded image, a filtering module to filter an image frame reconstructed from the encoded image, a block dividing module to divide the filtered image frame into a predetermined block dividing unit, a compression module to compress each of the plurality of blocks, to package the compressed plurality of blocks into a predetermined packaging unit and to generate lookup table information corresponding to each of the packaged blocks, a frame buffer memory to record the packaged data; and a first decompression module to decompress at least one of the packaged blocks corresponding to a particular frame for motion compensating by using the lookup table information, and a second decompression module to sequentially decompress to output the decompressed blocks by the first decompression module by using the lookup table information.

The present disclosure provides a method for processing a video for a video processing apparatus. The method for processing the video may include receiving an encoded image, filtering an image frame reconstructed from the encoded image, dividing the filtered image frame into a predetermined block dividing unit, compressing each of the plurality of blocks, packaging the compressed plurality of blocks into a predetermined packaging unit, generating lookup table information corresponding to each of the packaged blocks, recording the packaged data and the lookup table information, firstly decompressing at least one of the packaged blocks corresponding to a particular frame for motion compensating by using the lookup table information, and secondly and sequentially decompressing to output the decompressed blocks by using the lookup table information.

Meanwhile, the video processing method may be implemented as a computer-readable recording medium having a program executable on a computer.

Advantageous Effects

According to various embodiments, the present invention can provide an apparatus and method for processing a video, which is capable of improving processing efficiency by reducing bandwidths of a memory without degradation of quality, even for an image with a large number of pixels (4K 60 fps/120 fps, 8K 30 fps/60 fps/ . . . , etc.) to be processed per second.

Also, according to various embodiments, the present invention can provide an apparatus and method for processing a video, which is capable of improving processing performance by facilitating an access to a compressed frame buffer memory.

According to various embodiments, the present invention can provide an apparatus and method for processing a video, which is capable of reducing overhead of input and/or output information in a frame buffer memory and facilitating a system configuration and improving stability of the system by reducing a variation of bandwidths.

Also, according to various embodiments, the present invention can provide an apparatus and method for processing a video, which is capable of improving a performance of video processing, by selectively applying compression methods which may be different for each divided texture block, and by selecting a compression method to maximize effects for reducing bandwidth.

Moreover, according to various embodiments, the present invention can provide an apparatus and method for processing a video, which is capable of improving a performance of video processing by performing a variable-length coding for dual processed residual signal, and providing efficient methods for dividing and padding of texture blocks.

Also, according to various embodiments, the present invention can provide an apparatus and method for processing a video, which is capable of improving a performance of video processing by easily accessing to a frame memory by using lookup table information, and by decompressing the bandwidth reduced compressed data by receiving them rapidly.

MODE FOR INVENTION

Figure 1:
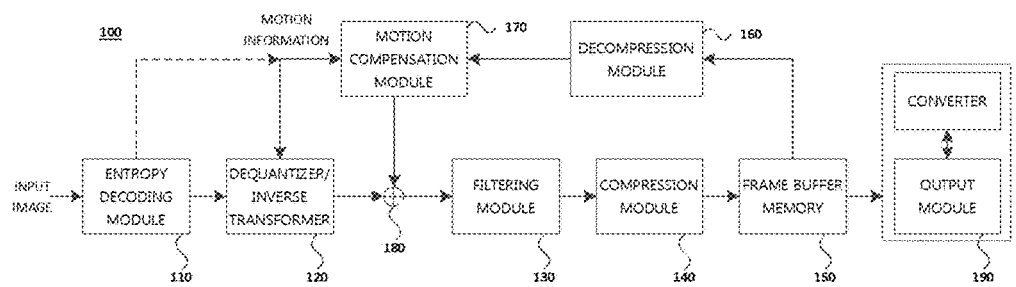
FIG. 1 is a block diagram illustrating a configuration of a video decoding apparatus in accordance with one exemplary embodiment disclosed herein.

Hereinafter, description will be given in detail of the preferred embodiments of the present invention to be easily practiced by those skilled in the art to which the present invention belongs, with reference to the accompanying drawings. However, the present invention can be embodied in many different forms and should not be construed as limited to those exemplary embodiments set forth herein. Configurations or elements unrelated to the description are omitted in the drawings as to clarify the present invention and like reference numerals refer to like elements throughout.

It will be understood that when an element is referred to as being "connected with" another element, the element can be connected with the other element or intervening elements may also be present.

It will be understood that when an element is referred to as being "on" another element, the element can be directly on the other element or intervening elements may also be present between the two elements.

Unless specified otherwise, the terms "comprise," "include," "comprising," and/or "including" specify the presence of elements and/or components, but do not preclude the presence or addition of one or more other elements and/or components. The terms "about" and "substantially" used in this specification to indicate degree are used to express a numerical value or an approximate numerical value when a mentioned meaning has a manufacturing or material tolerance and are used to prevent those who are dishonest and immoral from wrongfully using the disclosure of an accurate or absolute numerical value made to help understanding of the present invention. The term "stage (of doing)" of "stage of" used in this specification to indicate degree does not mean "stage for."

It will be noted that the expression "a combination thereof" in a Markush statement means a mixture or combination of one or more selected from the group consisting of elements mentioned in the Markush statement, being construed as including one or more selected from the group consisting of the elements.

To encoding an actual picture (image) and a depth information map thereof, High Efficiency Video Coding (HEVC) providing optimal coding efficiency among existing video coding standards, which is under joint standardization by the Moving Picture Experts Group (MPEG) and Video Coding Experts Group (VCEG), may be used as an example, without being limited thereto. A decoding apparatus according to an embodiment of the present invention may perform decoding through various types (MPEG2, AVC, etc.) of codecs using a frame buffer memory.

Generally, a video processing apparatus may include an encoding apparatus or a decoding apparatus. The encoding apparatus includes an encoding process and a decoding process, and the decoding apparatus includes a decoding process. The decoding process of the decoding apparatus may be the same as the decoding process of the encoding apparatus. Thus, the following description will be made on the decoding apparatus FIG. 1 is a block diagram illustrating a configuration of a video decoding apparatus in accordance with one exemplary embodiment of the present invention.

As illustrated in FIG. 1, a video decoding apparatus 100 disclosed herein includes an entropy decoding module 110, a dequantizer/inverse transformer 120, an adder 180, a filtering module 130, a compression module 140, a frame buffer memory 150, a decompression module 160, a motion compensation module 170, and an output module 190.

According to one exemplary embodiment of the present invention, the video decoding apparatus 100 may further include an intra/inter changeover switch and an intra prediction module. Here, this one exemplary embodiment illustrates in more detail a method of compressing and packaging a reference frame for generating a prediction block and a motion compensating process upon inter-frame prediction (in an inter mode) using the method.

The entropy decoding module 110 decodes a coded (encoded) bit stream transmitted from a video encoding apparatus to separate into an intra-prediction mode index, motion information, a quantization coefficient sequence, and the like. The entropy decoding module 110 may provide the decoded motion information to the motion compensation module 170.

The entropy decoding module 110 may provide the intra-prediction mode index to the motion compensation module 170 and the dequantizer/inverse transformer 120. Also, the entropy decoding module 110 may provide a dequantization coefficient sequence to the dequantizer/inverse transformer 120.

The dequantizer/inverse transformer 120 may transform the quantization coefficient sequence into a two-dimensional (2D) array of dequantization coefficients. The dequantizer/inverse transformer 120 may select one of a plurality of scanning patterns for transformation. The dequantizer/inverse transformer 120 may select one of the plurality of scanning patterns on the basis of at least one of a prediction mode (that is, one of intra prediction and inter prediction) of a current block and an intra prediction mode.

The dequantizer/inverse transformer 120 may receive the intra prediction mode from the motion compensation module 170 or the entropy decoding module 110.

The dequantizer/inverse transformer 120 recovers (or reconstructs) the quantization coefficients using a quantization matrix, which is selected from a plurality of quantization matrices, to the 2D array of dequantization coefficients. Different quantization matrices may be applied depending on a size of a current block to be reconstructed, and a quantization matrix may be selected for blocks of the same size based on the prediction mode of the current block and the intra prediction mode.

The dequantizer/inverse transformer 120 inverse-transforms the reconstructed quantization coefficients to reconstruct a residual block.

The adder 180 adds the residual block reconstructed by the dequantizer/inverse transformer 120 and a prediction block generated by the intra prediction module or the motion compensation module 170, thereby reconstructing a picture block.

The filtering module 130 filters off the reconstructed image, generated by the adder 180. Artifacts due to picture loss generated during a quantization process may be reduced by the filtering. For example, the filtering module 130 may perform a deblocking filtering process for removing a blocking effect occurring in a reconstructed picture, an adaptive offset application process for compensating for a difference value from an original picture by each pixel, and an adaptive loop filtering process for compensating for a difference value from an original picture by each coding unit.

The frame buffer memory 150 is a memory to store a local decoding picture which has been subjected to filtering by the filtering module 130. The frame buffer memory 150 may store a plurality of frames or pictures for motion compensation. Data formats of stored and output frames may be changeable by the compression module 140 and the decompression module 160.

The frame buffer memory 150, for example, may include at least one of storage media, such as a flash memory type, a hard disk type, a multimedia card micro type, a card memory type (e.g., SD or XD memory), RAM and ROM (e.g., EEPROM, etc.).

The compression module 140 is a module to compress frames stored in the frame buffer memory 150 according to the video processing method of the present invention. The decompression module 160 is a module to extract a random access target frame from the frame buffer memory 150, in response to a request of the motion compensation module 170, and to perform a decompression (inverse compression) for the target frame.

Specifically, the compression module 140 according to an exemplary embodiment of the present invention may perform lossless compression and uncompression to prevent degraded quality. Also, the compression module 140 may generate compression and information and separately manage the compression information in the form of a lookup table to realize a bandwidth reduction.

For example, the compression module 140 may receive the loop-filtered frame, perform an adaptive entropy process using DPCM with respect to the frame, and thus acquire losslessly-compressed texture segments.

The compression module 140 may generate compression information, which includes offset information related to each of the texture segments, package the texture segments by a burst length, and store the packaged texture segments in the frame buffer memory 150 along with the compression information. The frame buffer memory 150 may be an external memory which is connected through an AXI bus interface.

By virtue of the compression processing of the compression module 140 and the operation of the decompression module 160 according to the exemplary embodiment disclosed herein, random access of the motion compensation module 170 to the frame buffer memory 150 can be facilitated.

Also, 50% of the bandwidth reduction efficiency can result from the lossless compression and the storage based on the burst length according to the exemplary embodiment disclosed herein. The configuration of the compression module 140 will be explained later.

The motion compensation module 170 reconstructs an intra prediction mode of a current block on the basis of the intra prediction mode index received from the entropy decoding module 120, and generates a prediction block according to the reconstructed intra prediction mode.

Specifically, the motion compensation module 170 may randomly access the compressed picture stored in the frame buffer memory 150 through the decompression module 160 on the basis of motion vector information, and accordingly generate a prediction block for a current block. When a point-precision motion compensation is applied, a selected interpolation filter is used to generate the prediction block. The generated prediction block may be transferred to the adder 180.

Meanwhile, although not illustrated, the intra/inter changeover switch may provide the prediction block, which has been generated by one of the intra prediction module and the motion compensation module 170, to the adder 180 based on an encoding mode.

In order to generate the prediction block for the motion compensation, the motion compensation module 170 may further include a demultiplexer, a motion information encoding mode determination unit, a merge mode motion information decoding unit, an advanced motion vector prediction (AMVP) mode motion information decoding unit, a prediction block generation unit, a residual block decoding unit, and a reconstructed block generation unit.

The motion information includes a reference picture index and a motion vector. The reference picture index indicates any one picture previously encoded and reconstructed.

When a current block is subjected to unidirectional inter predictive encoding, the motion information indicates one of reference pictures included in list 0 (L0). On the other hand, when the current block is subjected to bidirectional predictive encoding, the motion information may include a reference picture index indicating one of the reference pictures of the list 0 (L0), and a reference picture index indicating one of reference pictures of list 1 (L1).

Also, when the current block is subjected to the bidirectional predictive encoding, the motion information may include one or two pictures among reference pictures included in a combined list (LC) of the list 0 and the list 1.

The motion vector indicates a position of a prediction block within a picture indicated by each reference picture index. The motion vector may be a pixel unit (integer unit) or a sub pixel unit.

For example, the motion vector may have a resolution of ½, ¼, ⅛ or ¹⁄₁₆ pixel. When the motion vector is not an integer unit, the prediction block is generated from integer pixels.

The demultiplexer demultplexes encoded motion information and encoded residual signals from a bit stream received. The demultiplexer transmits the demultiplexed motion information to the motion information encoding mode determination unit, and the demultiplexed residual signals to the residual block decoding unit.

The motion information encoding mode determination unit determines a motion information encoding mode of a current block. The motion information encoding mode determination unit may determine the motion information encoding mode of the current block according to skip_flag of a bit stream received. The motion information encoding mode may include, but not limited to, at least one of a skip mode, a merge mode and an AMVP mode.

The skip mode may be applied when a skip candidate having the same motion information as motion information on a current block is present and a residual signal is 0. Also, the skip mode may be applied when the current block has the same size as a coding unit. The current block may be regarded as a prediction unit.

The merge mode may be applied when a merge candidate having the same motion information as motion information on a current block is present. The merge mode may be applied when the current block has a different size from a coding unit or when a residual signal is present if the current block has the same size as the coding unit. The merge candidate may be the same as the skip candidate.

The AMVP mode may be applied when the skip mode and the merge mode are not adopted. An AMVP candidate having the most similar motion vector to a motion vector of a current block is selected as an AMVP predictor.

The prediction block generation unit generates a prediction block of a current block using the reconstructed motion information. When the motion vector is an integer unit, the prediction block generation unit may generate a prediction block of a current block by copying a block, which corresponds to a position represented by a motion vector in a picture indicated by a reference picture index.

However, when the motion vector is not an integer unit, the prediction block generation unit may generate pixels of the prediction block from integer pixels within the picture indicated by the reference picture index. In this instance, in a luma pixel, a predictive pixel may be generated using a 8-tap interpolation filter. In a chroma pixel, a predictive pixel may be generated using a 4-tap interpolation filter.

The residual block decoding unit performs entropy decoding with respect to residual signals. The residual block decoding unit inversely scans entropy-decoded coefficients so as to generate a 2D block of quantized coefficients. Different types of inverse scanning may be used depending on entropy decoding methods.

That is, different inverse scanning methods may be used for the inter predicted residual signals depending on CABAC-based decoding and CAVLC-based decoding. For example, diagonal raster inverse scanning may be available for CABAC-based decoding, while zigzag inverse scanning may be available for CAVLC-based decoding.

Also, different inverse scanning methods may be decided depending on a size of the prediction block.

The residual block decoding unit dequantizes a generated coefficient block using a dequantization matrix. A quantization parameter is reconstructed to derive the quantization matrix. A quantization step size is reconstructed by each coding unit of a predetermined size or larger. The predetermined size may be 8×8 or 16×16.

The residual block decoding unit may inversely transform the dequantized coefficient block to reconstruct a residual block. The reconstructed block generation unit may add the prediction block generated by the prediction block generation unit and the residual block generated by the residual block decoding unit.

In this manner, a current block may be reconstructed by using the reconstructed prediction block of the current block and the decoded residual block of the current block. The reconstructed current block may then be filtered and compressed to be stored in the frame buffer memory 15. Such current block may be transferred to the motion compensation module 170 after being decompressed or output to the output module 190.

The output module 190 may process data output from the frame buffer memory 150, and display or externally transmit the processed data. An image signal, a data signal, an OSD signal and the like, processed in the output module 190 may be converted into R, G, and B signals, respectively, thereby being generated as driving signals.

Also, the output module 190 may further include a converter to reconstruct data compressed by the compression module 140 into an image signal. The output module 190 may include PDP, LCD, OLED, flexible display, 3D display and the like to display the converted image signal.

Figure 2:
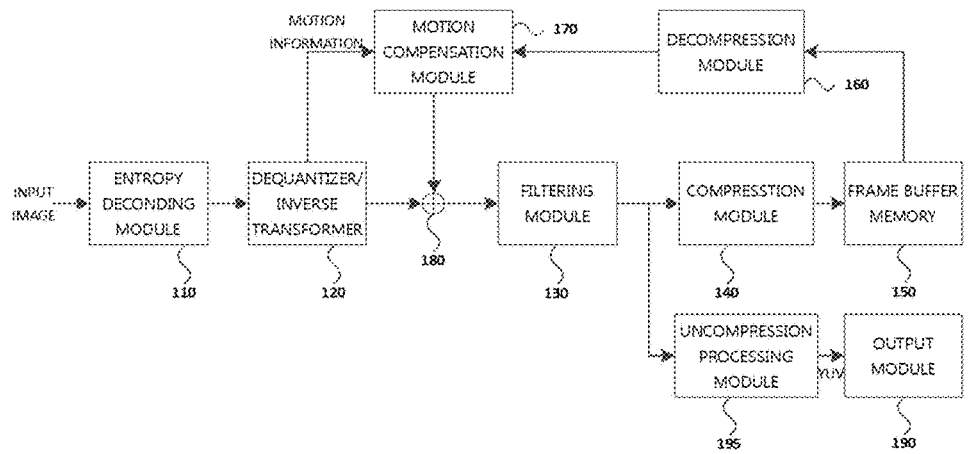
FIG. 2 is a block diagram illustrating a configuration of a video decoding apparatus in accordance with another exemplary embodiment disclosed herein.
Figure 3:
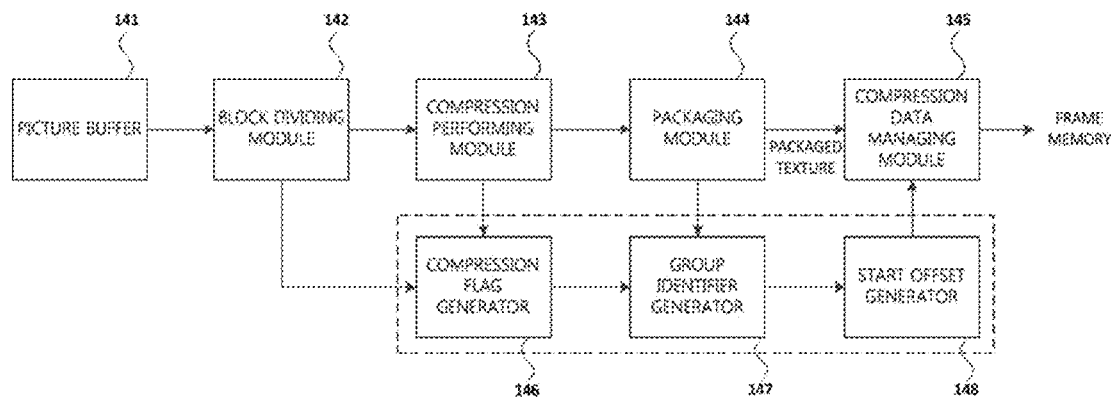
FIG. 3 is a block diagram illustrating in more detail a configuration of a compression module of a video decoding apparatus in accordance with an exemplary embodiment disclosed herein.

FIG. 2 is a block diagram illustrating a configuration of a video decoding apparatus in accordance with another exemplary embodiment disclosed herein.

As illustrated in FIG. 2, a video decoding apparatus 100 according to another embodiment according to the present invention includes an entropy decoding module 110, a dequantizer/inverse transformer 120, an adder 180, a filtering module 130, a compression module 140, a frame buffer memory 150, an decompression module 160, a motion compensation module 170, and an output module 190. The video decoding apparatus 100 may further include an uncompression processing module 195.

In FIG. 2, the other components except for the compression module 140, the uncompression processing module 195 and the output module 190 perform similar operations to those illustrated in FIG. 1, so detailed description thereof will be omitted.

As illustrated in FIG. 2, the uncompression processing module 195 included in another embodiment disclosed herein may transfer an image, which has been filtered by the filtering module 130, directly to the output module 190 without passing through the compression module 140.

Specifically, the uncompression processing module 195 may transfer an image frame, which has been subjected to decoding and filtering, to the output module 190 in a line-by-line writing manner. To this end, the uncompression processing module 195 may include a separate buffer memory. A burst length of data may be predetermined as 64 bytes, 128 bytes or the like.

In this manner, when a pure YUV image signal which is uncompressed is transferred to the output module 190, the output module 190 may output the image signal directly through a display or the like even without performing the decompression (or inverse compression). Also, the output module 190 may easily perform post-processing such as scaling by using the pure YUV image signal, which may result in extending a utilization range.

Therefore, the exemplary embodiment illustrated in FIG. 2 may not include a separate decompression processor, and the compression module 140 may compress only a reference frame which is used for motion compensation and store the compressed reference frame in the frame buffer memory, thereby improving video processing efficiency.

Hereinafter, description will be given in detail of the configuration of the compression module of the video encoding apparatus in accordance with an embodiment disclosed herein.

In accordance with one exemplary embodiment of the present invention, the compression module 140 may include a picture buffer 141, a block dividing module 142, a compression performing module 143, a packaging module 144, a compression data managing module 145, a compression flag generator 146, a group identifier generator 147, and a start offset generator 148.

The picture buffer 141 may receive an image signal which has been filtered and output from the filtering module 130, and store the image signal in a buffer by each frame.

The block dividing module 142 acquires each frame from the picture buffer 141, and divides the acquired frame into a plurality of compression blocks according to a size of a preset compression unit. In this embodiment of the present invention, the size of the compression unit may be fixed, and each frame may be divided into 16×4 blocks, for example.

The compression performing module 143 decides whether or not to compress each block, and perform a lossless compression for blocks which have been decided to be compressed.

Specifically, according to the exemplary embodiment of the present invention, the compression performing module 143 may select one of lossless compression or uncompression for each divided block.

For example, the compression performing module 143 may select, as a compression method, a lossless variable-length compression method, such as a DPCM entropy coding method.

However, the compression performing module 143 may compare a size of data subjected to the variable-length compression with a size of uncompressed data, and select the uncompression method when the size of the data subjected to the variable-length compression is greater than the size of the uncompressed data.

In this manner, the compression performing module 143 may apply different compression methods for each block, and in some cases, employ the uncompression processing.

Also, the compression performing module 143 may select a method which can provide optimal bandwidth efficiency from the compression or the uncompression. Specifically, in order to overcome a degradation of quality due to the loss compression and a reduction of bandwidth efficiency due to an increased calculation, which are caused in the related art, the compression performing module 143 may also select a method for maximizing only the reduced bandwidth efficiency, irrespective of a compression degree.

Accordingly, the compression performing module 143 may transfer information indicating whether or not to compress a current block to the compression flag generator 146.

Then, the compression flag generator 146 may generate a compression flag which indicates whether or not to compress the current block. The compression flag, for example, may have a form of 1-bit flag indicating compression or uncompression. The compression flag may correspond to each block, and be transferred to the group identifier generator.

Meanwhile, the packaging module 144 groups data compressed by the compression performing module 143 for each block, and packages the grouped data.

The packaging module 144 may arrange the compressed blocks in one line, and group the arranged blocks on the basis of a burst length of the frame buffer memory 150. Each compressed block set grouped in the packaging module 144 may be referred to as a burst group (BG).

For example, a burst length may be 128 bytes. In this instance, the packaging module 144 groups the compressed blocks to be included in a group based on the 128-byte burst length for packaging.

The packaging module 144 transfers the packaged texture data to the compression data managing module 145 for each burst group. The compression data managing module 145 may perform writing for the frame buffer memory 150 for each burst group. This may bring about a reduction of a bandwidth variation resulting from the variable-length compression. Also, since compression efficiency of the lossless compression is maintained, the packaging module 144 can maintain an improved state of bandwidth efficiency (or a reduced state of bandwidths required) while maintaining system stability.

Also, the packaging module 143 may generate packaging information, which indicates a group to which each block belongs in response to being packaged and a position within the group, and transfer the packaging information to the group identifier generator 147.

The group identifier generator 147 may generate a group identifier which indicates a group, to which a currently-processed block belongs, from the packaging information. The group identifier may include a 8-bit burst group identifier (ID), for example.

The burst group identifier may indicate a relative position of each group with respect to a specific base address.

The start offset generator 148 may generate start offset information which indicates a start position of a current block within a group on the basis of the packaging information. The offset information, for example, may include 7-bit start byte offset information. The start byte offset information may indicate a relative start position of each block.

Meanwhile, the compression flag generator 146, the group identifier generator 147 and the start offset generator 148 may transfer the compression flag, the group identifier and the start offset information, which are related to the current block, to the compression data managing module 145, respectively.

The compression data managing module 145 may generate lookup table information by combining the compression flag, the group identifier and the start offset information, and record the generated lookup table information in the frame buffer memory 150.

In more detail, the compression data managing module 145 may generate the lookup table information corresponding to each block. The compression data managing module 145 may generate 2-byte lookup table information by using 1-bit compression flag, 8-bit group identifier and 7-bit offset information.

The generated lookup table information and the packaged data may be recorded in the frame buffer memory 150. As aforementioned, the packaged data may be recorded in the frame buffer memory 150 on the basis of the burst length.

When the 2-byte lookup table information is accumulated by each burst length (for example, 128 bytes of lookup table information for 64 blocks are accumulated), the compression data managing module 145 may record the lookup table information in the frame buffer memory 150. Therefore, the recording of the lookup table information may be maintained based on the burst length of the memory. This may result in maintaining the improved bandwidth without change and improving system stability.

That is, in the embodiment of the present invention, in the packaging module 144, the unit of packaging the compressed texture block may be the same as the unit of recording the lookup table information. Also, each unit may correspond to the burst length of the frame buffer memory 150. This configuration may cause the improvement of the bandwidth efficiency.

The compression data managing module 145 may refer to lookup table information relating to a previous block in order to generate lookup table information relating to a current block. In this instance, for blocks belonging to the same group, the same data cannot be repetitively processed, thereby reducing an amount of data processed.

The frame buffer memory 150 records data output from the thusly-configured compression module 140. Specifically, the compression data managing module 145 may control and manage the data recorded in the frame buffer memory 150.

Accordingly, the frame buffer memory 150 may store and maintain the compressed texture blocks, which have been packaged, by each frame, and also separately store and maintain lookup table information corresponding to each frame.

Also, the lookup table information may include 2-byte information for 16×4 block each. In one embodiment, the lookup table information may include burst group identification information and start offset information, which may allow for representing an offset, starting from a base address corresponding to each preset burst group, other than every address of the frame buffer memory 150.

Here, information related to the base address corresponding to each burst group may be separately stored and managed by the decompression module 160 and the compression module 140, respectively. Therefore, the decompression module 160 does not have to use all of the memory addresses to access the frame buffer memory 150.

Accordingly, the decompression module 160 can fast access a specific block even when it receives only the lookup table information from the frame buffer memory 150.

Also, by virtue of presetting the burst group identifiers and the corresponding base addresses and transmitting and receiving only the lookup table information associated therewith, overhead caused due to the transmission and reception of all of the values of the memory addresses can be reduced. This may result in improvement of data processing efficiency and reduction of bandwidths.

Meanwhile, the lookup table information included in the frame buffer memory 150 may be transferred to the decompression module 160. The decompression module 160 may access a specific position of the frame buffer memory 150 with reference to the lookup table information, thereby performing random access in response to a request of the motion compensation module 170. To this end, the decompression module 160 may include a first cache which requests the lookup table information from the buffer memory 150 and stores and manages the lookup table information.

In more detail, when a specific frame is identified in response to the request of the motion compensation module 160, the decompression module 160 may acquire group identification information, start offset information and a compression flag relating to each of blocks corresponding to the frame with reference to the lookup table information.

The decompression module 160 may then access a specific address of the frame buffer memory 150 corresponding to each block on the basis of the group identification information and the start offset information. Accordingly, in the embodiment according to the present invention, a problem that a long time is taken to search for a specific block, which has been caused in the related art compression method, can be overcome, and fast processing can be carried out while maintaining a bandwidth reduction effect.

The decompression module 160 may determine whether or not to decompress text blocks according to the compression flags, and if required, perform the decompression. The decompression module 160 may reconstruct the decompressed blocks to generate frame data requested by the motion compensation module 170. The decompression module 160 may then transfer the generated frame data to the motion compensation module 170.

Afterwards, the motion compensation module 170 may generate the prediction block based on the motion vector information, as aforementioned, and transfer the generated prediction block to the adder 180 to perform decoding of the image through the motion compensation in a sequential manner.

Hereinafter, description will be given of a video processing method according to an exemplary embodiment of the present invention, with reference to FIGS. 4 to 12.

Figure 4:
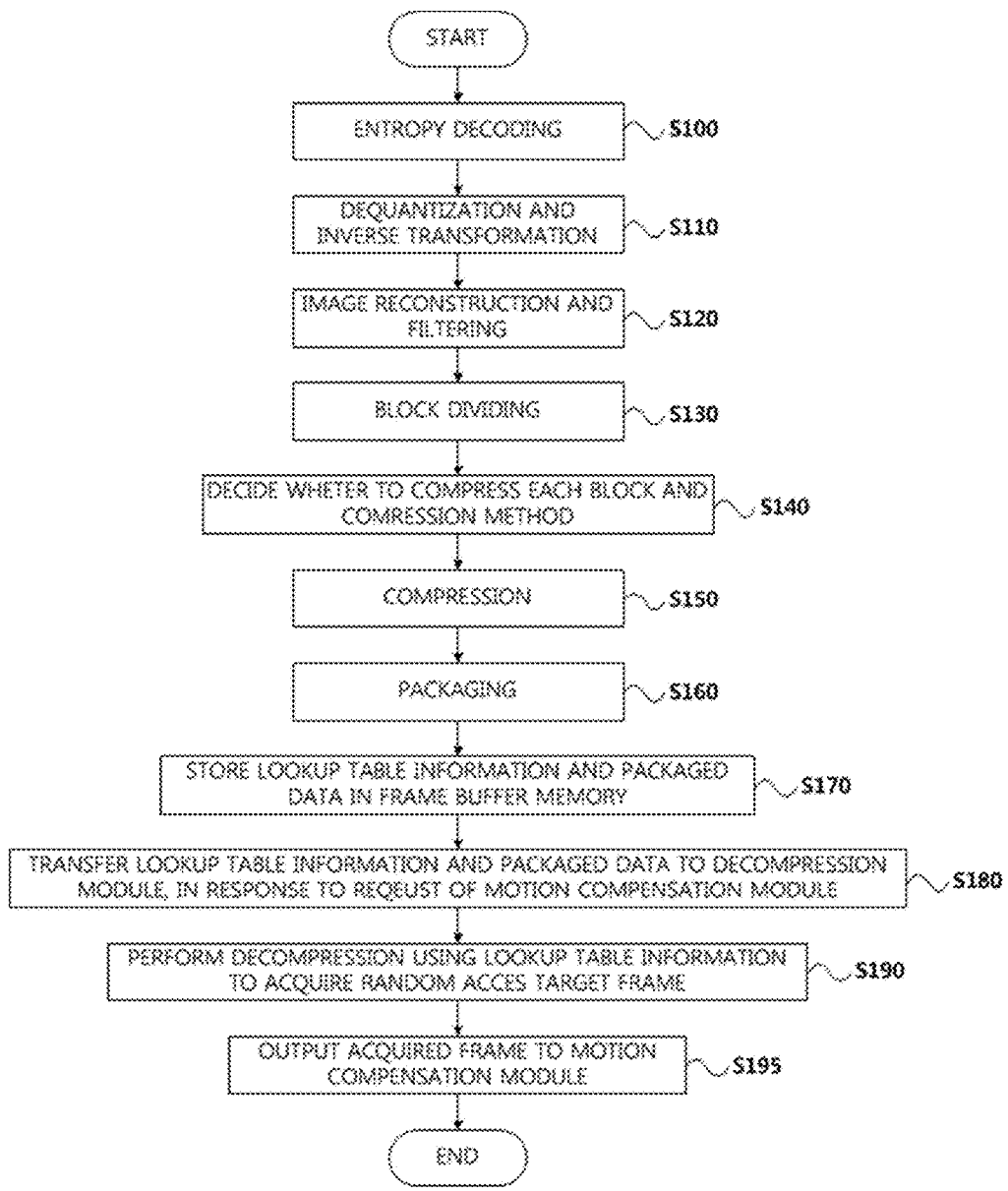
FIG. 4 is a flowchart illustrating a video decoding method in accordance with an exemplary embodiment disclosed herein.

As illustrated in FIG. 4, the video processing apparatus 100 receives a bit stream including encoded image data, and entropy-decodes the received bit stream (S100).

The video processing apparatus 100 performs dequantization and inverse transformation for the entropy-decoded image data (S110).

As aforementioned, the entropy decoding module 110 may decode the encoded bit stream which is transmitted from a video encoding apparatus, to separate into an intra prediction mode index, motion information, a quantization coefficient sequence and the like. The entropy decoding module 110 may provide the decoded motion information to the motion compensation module 170. The entropy decoding module 110 may also provide a dequantization coefficient sequence to the dequantizer/inverse transformer 120.

The dequantizer/inverse transformer 120 then transforms the quantization coefficient sequence into a 2D array of dequantization coefficients, selects one of a plurality of scanning patterns based on at least one of a prediction mode (i.e., one of intra prediction and inter prediction) of a current block and an intra prediction mode, and reconstructs the quantization coefficients using a quantization matrix, which is selected from a plurality of quantization matrices, to the 2D array of dequantization coefficients. The dequantizer/inverse transformer 120 inversely transforms the reconstructed quantization coefficients to reconstruct a residual block.

Afterwards, the video processing apparatus 100 reconstructs the image using the residual block and a prediction block, and filters the reconstructed image (S120).

As aforementioned, the adder 180 may reconstruct an image block by adding the residual block reconstructed by the dequantizer/inverse transformer 120 and the prediction block generated by the intra prediction module or the motion compensation module 170. The filtering module 130 may filter off the reconstructed image generated by the adder 180. The detailed filtering method has been described.

Afterwards, the video processing apparatus 100 divides the filtered frame by each block (S130).

The compression module 140 may divide the image frame into blocks, in order to compress and package image frame textures filtered by the filtering module 130 and record the packaged image frame textures in the frame buffer memory 150.

The video processing apparatus 100 decides whether or not to compress each divided block and a compression method (S140), and performs the compression for each block according to the decided method (S150). The video processing apparatus 100 then packages the compressed texture blocks (S160).

Afterwards, the video processing apparatus 100 stores lookup table information and packaged data into frame buffer memory (S170).

Figure 5:
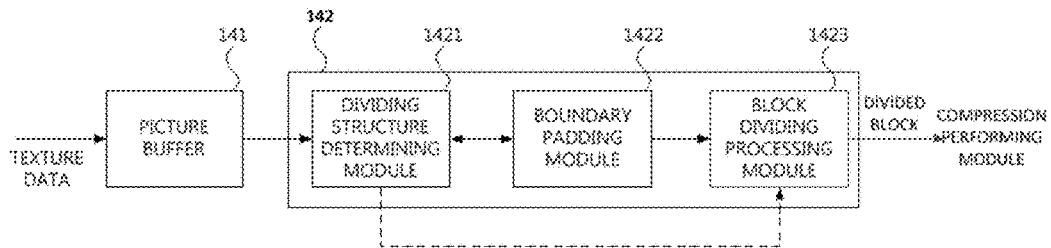
FIG. 5 is a view illustrating a block dividing module of the video processing apparatus in detail according to an exemplary embodiment disclosed herein.

FIG. 5 is a view illustrating a block dividing module 142 of the video processing apparatus 100 in detail according to an exemplary embodiment disclosed herein.

As shown in FIG. 5, the block dividing module 142 comprises a dividing structure determining module 1421, a boundary padding module 1422 and a block dividing processing module 1423.

The dividing structure determining module 1421 receives data of a picture from the picture buffer 141, and determines a dividing structure by analyzing the data of the picture received. In an embodiment of present invention, the picture analyzed may be corresponding to one image which constructing one video frame. The picture may include data of Y value, Cr value, and Cb value for each pixel which constructing the picture.

The dividing structure determining module 1421 may analyze the picture and identify horizontal and vertical lengths. The dividing structure determining module 1421 may determine a dividing structure based on the horizontal and vertical length. Especially, the dividing structure determining module 1421 may use a predetermined block unit to determine the dividing structure capable of dividing the horizontal and vertical lengths of the picture by the block unit.

For example, the block unit may have a size of 16×4 pixels. The dividing structure determining unit 1421 may determine the dividing structure to divide the picture into a plurality of blocks by segmenting the horizontal length of the picture into 16 pixel unit and the vertical length of the picture into 4 pixel unit.

Moreover, the dividing structure determining module 1421 may determine whether a size of the picture is multiple of a size of the block unit. It may not be that the size of the picture is multiple of a size of the block unit because the size of the picture have many variations according to its resolution.

Also, if the size of the picture is not multiple of a size of the block unit, a size of boundary divided portion may be smaller than the size of the block unit. Thus, the dividing structure determining module 1421 may determine a boundary block having the size of the block unit which includes the boundary divided portion. The dividing structure determining module 1421 may transfer information of the boundary block to the boundary padding module 1422.

Meanwhile, if the size of the picture is multiple of a size of the block unit, the dividing structure determining module 1421 may determine the dividing structure and generate dividing structure information. The block dividing processing module 1423 may process dividing the picture according to the dividing structure information to transfer each divided texture block into the compression performing module 143.

However, if the size of the picture is not multiple of a size of the block unit, the dividing structure determining module 1421 may transfer a boundary block information of the boundary block, which includes the boundary divided portion having different size with the size of the block unit, to the boundary padding module 1422.

For example, if a horizontal size of the picture is 1610 pixels and the picture is divided by 16×4 block unit based on the upper left end pixel, a horizontal boundary divided portion (horizontal 10 pixels×vertical length of the picture) is not fit into the size of the block unit. Then the dividing structure determining module 1421 may determine the boundary block including the boundary divided portion, and transfer information of the boundary block to the boundary padding module 1422.

After receiving the information of the boundary block, the boundary padding module 1422 performs padding for each of the boundary block by the block unit.

Here, the boundary padding module 1422 may perform padding based on the information received from the dividing structure determining module 1421. The boundary block may include the boundary portion as said and a non-picture region. And the boundary padding module 1422 may perform padding by inserting predetermined certain pixels into the non-picture region.

In particular, the boundary padding module 1422 can configure values of the pixels which padded in one direction to have same values corresponding to a horizontal (or vertical) boundary pixel of the boundary block. To this end, in the non-picture region of the boundary block, pixels having same value of the horizontal (or vertical) boundary pixel can be padded in horizontal (or vertical) direction.

According to the operation of the boundary padding module 1422, the boundary block can have texture data having size of the block unit, and the video processing apparatus 100 can process continuously compression and decompression of the block units having identical size. It makes reducing of variation of the texture size, and the bandwidth efficiency can be improved.

Also, an embodiment of the present invention, by configuring values of the padded pixels into values of horizontal or vertical boundary values of the picture, compression efficiency using DPCM coding can be improved by making zero residual signals in the horizontal or vertical direction.

When the padding is completed, the boundary padding module 1422 may transfer the padded block unit into the block dividing processing module 1423 or the dividing structure determining module 1421.

Meanwhile, the block dividing processing module 1423 may divide the boundary padded picture from the boundary padding module 1422 or the dividing structure determining module 1421 or original picture into a plurality of the block units. And all of the block units may have identical size. The plurality of the block units divided may be transferred sequentially to compression performing module 143.

Figure 6:
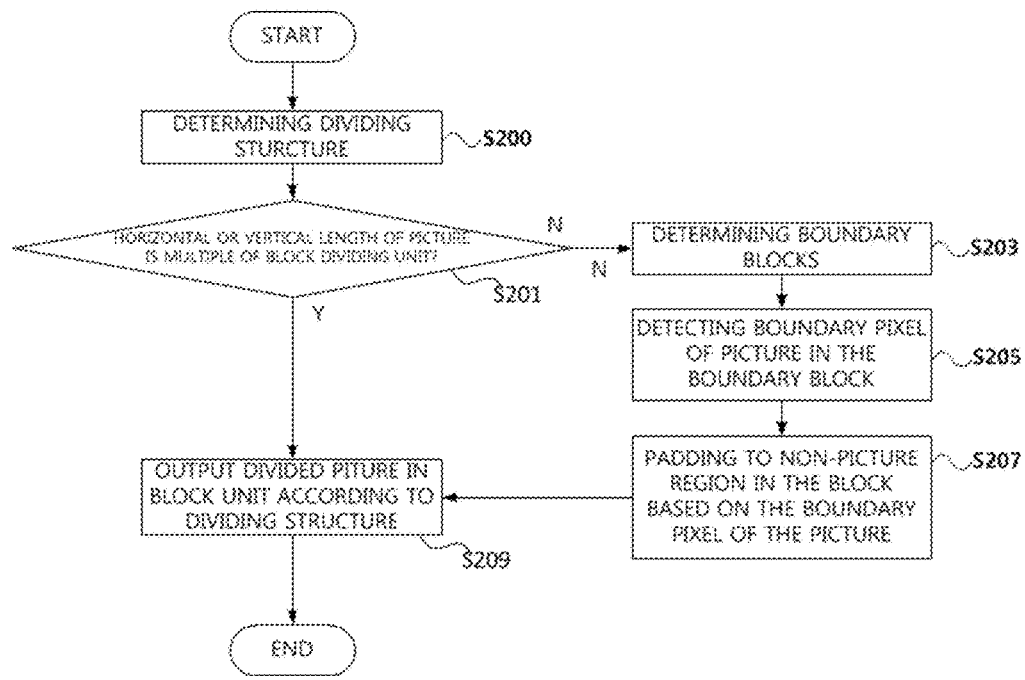
FIG. 6 is a flowchart for illustrating operation of the block dividing module in detail.

FIG. 6 is a flowchart for illustrating operation of the block dividing module in detail.

First, the block dividing module 142 determines a dividing structure and generates dividing structure information (S200).

Next, the block dividing module 142 determines whether the vertical and horizontal size of the picture is multiple of the predetermined size of the block unit.

As mentioned above, the dividing structure determining module 1421 may identify the horizontal and vertical size of the picture based on the picture from the picture buffer 141. And, it may determine whether the identified vertical and horizontal size of the picture is multiple of the predetermined size of the block unit.

If the size of the picture is not multiple of the dividing size of the block unit, the block dividing module 142 determines boundary blocks (S203).

If the size of the picture is not multiple of the dividing size of the block unit, the dividing structure determining unit 1421 may determine the remaining portion of the picture smaller than the dividing block unit size as the boundary region when the picture is divided by the dividing block unit and determine the region of the dividing bock unit including the boundary region as the boundary block. Thus, the boundary block may include both of the boundary region of the picture and the non-picture region.

And, the block dividing module 142 detects boundary pixels of the picture in the boundary block (S205).

The boundary padding module 1422 may obtain boundary block information from the dividing structure determining module 1421. The boundary block information may include position information of the boundary blocks, and identify information of boundary region and non-picture region.

Then the boundary padding module 1422 may detect pixels corresponding to a boundary of the picture in the boundary block based on the boundary block information. Here, the boundary pixels may include a plurality of pixels according to a horizontal or vertical length.

After, the block dividing module 142 performs padding to the non-picture region of the block based on the boundary pixels (S207).

As mentioned, the boundary padding module 1422 may pad same value as the boundary pixel into the non-picture region of the boundary block. Through this, the residual signal in a horizontal or vertical direction may become zero, and the compression efficiency for DPCM codding can be improved.

Then, the block dividing module 142 divides the picture according to the dividing structure information to output the picture by the block unit to the compression performing module 143.

Figure 7:
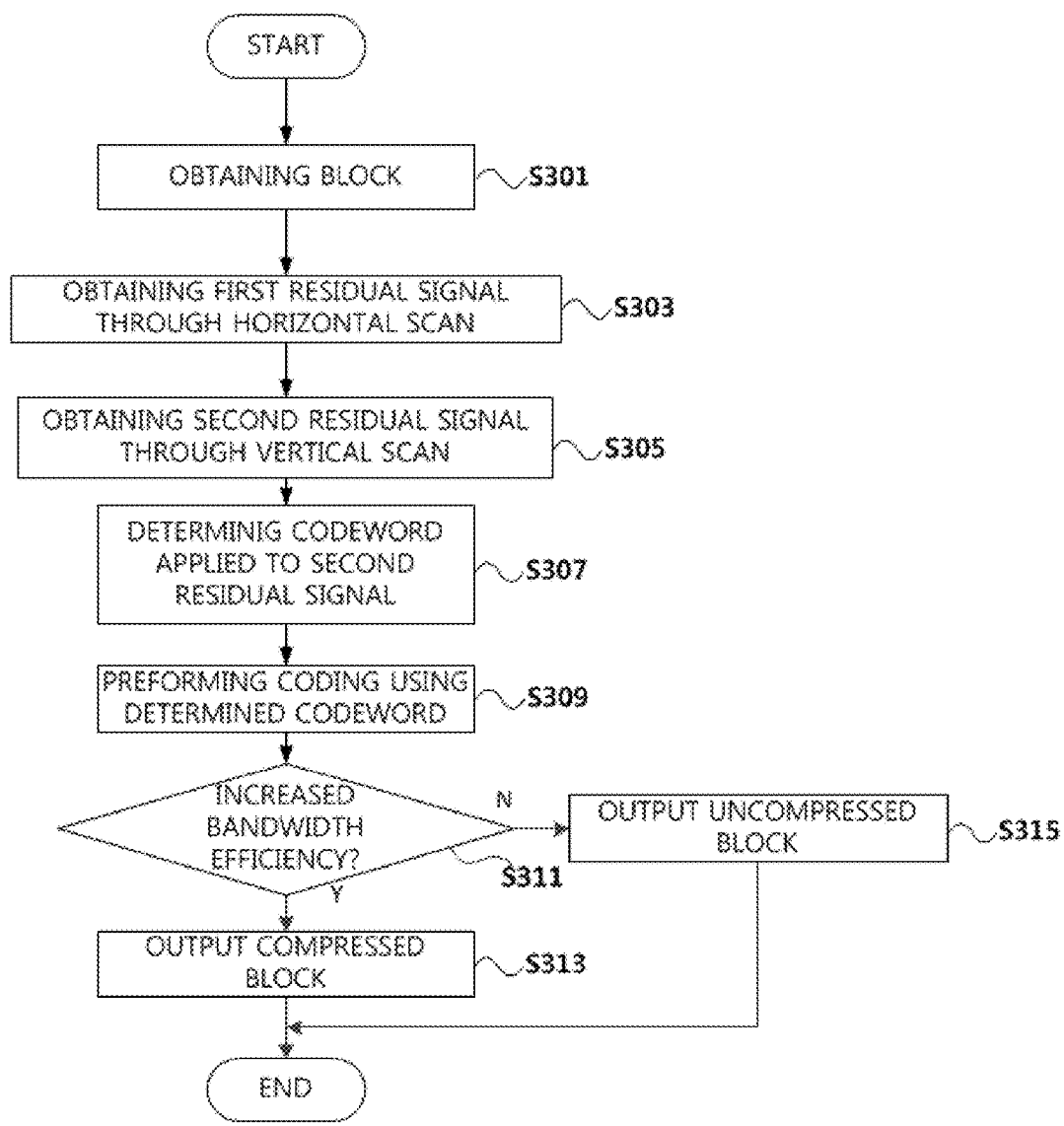
FIG. 7 is a flowchart for illustrating processes of compression for the divided blocks according to an exemplary embodiment of the present invention.

FIG. 7 is a flowchart for illustrating processes of compression for the divided blocks according to an exemplary embodiment of the present invention.

Referring to the FIG. 7, the compression performing module 143 obtains the blocks first (S301).

Each of texture blocks divided by the block dividing module 142 may be transferred sequentially to the compression performing module 143. The compression performing module 143 may perform compression using each method for the each blocks.

To this end, the compression performing module 143 obtains the first residual signal by horizontal scanning (S303).

For example, the compression performing module 143, for the horizontal scanning, may allocate a pixel value in (y, x) coordinates of the picture into a buffer, update the buffer as calculated value by calculating difference with next pixel (y, x−1) according to the horizontal scanning order. This may be performed to the each pixels of each blocks, and the horizontal scanned first residual signal may be generated.

After, the compression performing module 143 obtains the second residual signal by vertical scanning (S305).

For example, the compression performing module 143, for the vertical scanning, may allocate a pixel value in (y, x) coordinates of the horizontal scanned first residual signal a buffer, update the buffer as calculated value by calculating difference with next pixel (y−1, x) according to the vertical scanning order. This may be performed to the each pixels of each blocks, and the vertical scanned second residual signal may be generated.

Then, the compression performing module 143 selects a code word to apply to the second residual signal (S307).

The compression performing module 143, for lossless compression, may perform a variable-length coding using one of a plurality of code words. The plurality of the code words may include a plurality of exponential golomb codes corresponding to order numbers different from each other. The compression performing module 143 may determine one of the code words applying to the current block which is most efficient for bandwidth. For example, the compression performing module 143 may determine 3rd exponential golomb code as coding code word based on the bandwidth efficiency.

Next, the compression performing module 143 performs coding based on the determined code word (S309). Then, the compression performing module 143 determines whether the bandwidth efficiency is increased by comparing with the non-compression case (S311).

In the variable-length coding, although the codding has performed, the bandwidth which is needed for reading and writing the data to the memory can be increased. Therefore, in the present invention, improvements of the bandwidth efficiency can be determined by comparing with non-compression case of the current block.

If the bandwidth efficiency is increased, the compression performing module 143 outputs the compressed block (S313). And, if the bandwidth efficiency is not increased, the compression performing module 143 outputs the uncompressed block (S315).

Figure 8:
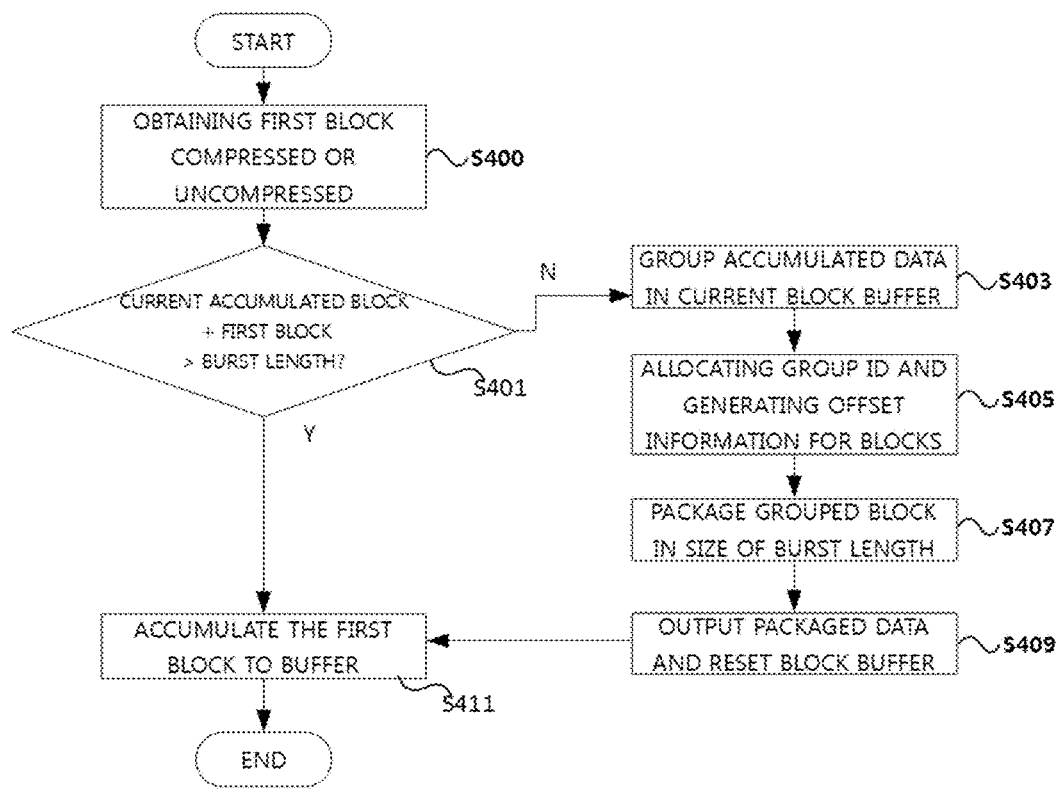
FIG. 8 is a flowchart for illustrating processes of packaging blocks according to an exemplary embodiment of the present invention.

FIG. 8 is a flowchart for illustrating processes of packaging blocks according to an exemplary embodiment of the present invention.

The packaging module 144 may obtain the compressed or uncompressed blocks and package the blocks into a burst length of the memory. Also, the packaging module 144 may generate and transfer the lookup table information to other modules according to the packaging.

First, the packaging module 144 obtains the first block compressed or uncompressed (S400).

Then, the packaging module 144 determines whether sum of block data amounts accumulated in current block buffer and data amounts of the first block is bigger than the burst length of the memory, groups the data accumulated in current block buffer (S403).

And, the packaging module 144 allocates a group identifier to the grouped data, and generates offset information for each block in the group. The group identifier may correspond to a base address of the memory, and the offset information may indicate relative addresses of blocks in the group. The group identifier and the offset information may be included in the lookup table information, and managed separately with the packaged data.

And, the packaging module 144 packages the grouped block data into the burst length (S407), output to the memory, and reset current block buffer (S409).

In particular, for improving bandwidth efficiency, if the grouped block data is smaller than the burst length, the packaging module 144 may package the data into the burst length by adding a dummy region to the grouped block data.

Meanwhile, if the block buffer is reset or sum of block data amounts accumulated in current block buffer and data amounts of the first block is smaller than the burst length of the memory, the first block is accumulated to the block buffer (S411).

Figure 9:
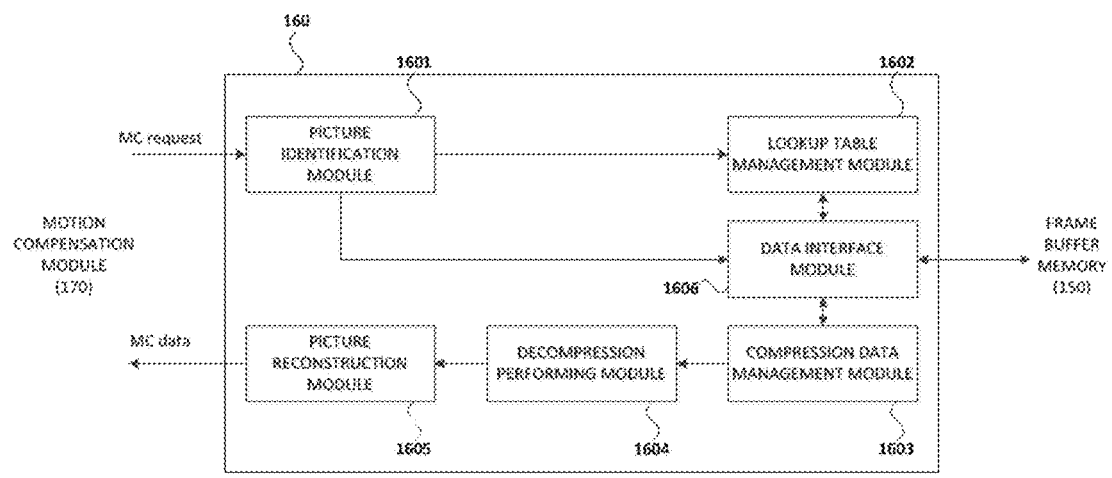
FIG. 9 is a view illustrating a decompression module of the video processing apparatus in detail according to an exemplary embodiment disclosed herein.

FIG. 9 is a view illustrating a decompression module of the video processing apparatus in detail according to an exemplary embodiment disclosed herein.

Referring to the FIG. 9, the decompression module 160 may include a picture identification module 1601, a lookup table management module 1602, a compression data management module 1603, a decompression performing module 1604, a picture reconstruction module 1605 and a data interface module 1606.

The decompression module 160 may process obtaining a target picture for random access from the frame buffer memory 150 according to a request of the motion compensation module 170, and transferring the picture to the motion compensation module 170. Thus, the decompression module 160 can be called as texture data processor for motion compensation including decompress module or decompressor.

The picture identification module 1601 may receive data requests for motion compensation from the motion compensation module 170, generate picture identification information, and transfer the information to the lookup table management module 1602 or the data interface module 1606.

For example, the picture for motion compensation may be a random access target picture for processing a motion compensation to the next frame, and the motion compensation module 170 may transfer data request including identification information of the random access target picture to the data interface module 1606. Also, for example, the target picture may be a reference picture which is available to be used for inter-prediction of the current processing block. In this, the reference picture used for inter-prediction of the current processing block in reference pictures included in a reference picture list may be indicated by a reference picture index. Thus, the reference picture index may be considered as an indicator of the reference picture used for inter-prediction of the current processing block in reference pictures included in a reference picture list.

The reference picture may include STRP (Short term reference picture) and LTRP (Long Term Reference Picture). Here, STRP and LTRP may be reconstructed pictures stored in DPB (Decoded Picture Buffer). STRP may be marked as "used for short-term reference" or "used for reference". Also, LTRP may be marked as "used for long-term reference" or "used for reference". For example, a POC (Picture Order Count) difference between a decoding target picture and LTRP may have one of the value ranged '1' to '224-1'. The POC may indicate sequence of displaying of the picture.

The picture identification module 1601 may identify target picture using the reference picture index, etc.

The lookup table management module 1602 receives lookup table information from frame buffer memory 150 through the data interface module 1606. To this end, the lookup table management module 1602 may include a cache memory for lookup table. Also, the cache memory may include the lookup table information corresponding to each picture identification information.

And, the lookup table management module 1602 may search particular lookup table information corresponding to picture identification information according to a request from the picture identification module 1601, and transfer the searched lookup table information to the data interface module 1606. The particular lookup table information may include each position information on the frame buffer memory 150 for a plurality of block units in one picture. To this end, as mentioned above, the lookup table information may include group identification information and offset information.

The data interface module 1606 may receive compressed texture data from the frame buffer memory 150 by using particular lookup table information corresponding to the requested picture, and transfer the data to the compression data management module 1603.

The data interface module 1606 can improve processing speed by directly accessing to particular position on the frame buffer memory 150 according to the group identification information and the offset information.

The compression data management module 1603 stores the compressed texture data into a buffer and manages it. And the compression data management module 1603 transfer compressed texture data corresponding to a requested picture to the decompression performing module 1604.

The decompression performing module 1604 determines whether compression of each block in the compressed texture data, and performs decompression for compressed blocks. The decompression performing module 1604 can bypass uncompressed blocks to the picture reconstruction module 1605.

As mentioned, the lookup table information may include the compression flag. Thus, the decompression performing module 1604 may determine whether compressed or uncompressed by using the compression flag in the lookup table information.

Then, the decompression performing module 1604 may perform decompression for each compressed block. The decompression performing module 1604 may firstly identify the compression method applied to the compressed block, and perform decompression using the identified compression method. The compression method may be one of variable-length coding compression methods using a plurality of code words sets.

For identifying compression method for the compressed block of the decompression performing module 1604, there may be many ways for signaling. For example, the lookup table information may contain identification of code word used for the compression. Also, the decompression performing module 1604 may identify the code word used for the compression by data property of the compressed block. Moreover, identification information of the code word used for the compression may be included in part of the compressed block data.

And, the picture reconstruction module 1605 collects decompressed or uncompressed blocks, and reconstructs a picture using them. The picture reconstruction module 1605 may identify size of the original picture, and remove added texture by padding to obtain a reconstructed picture same as the original picture.

Reconstructed data of the picture reconstruction module 1605 may be transferred to the motion compensation module 170, and be used as the reference picture.

Figure 10:
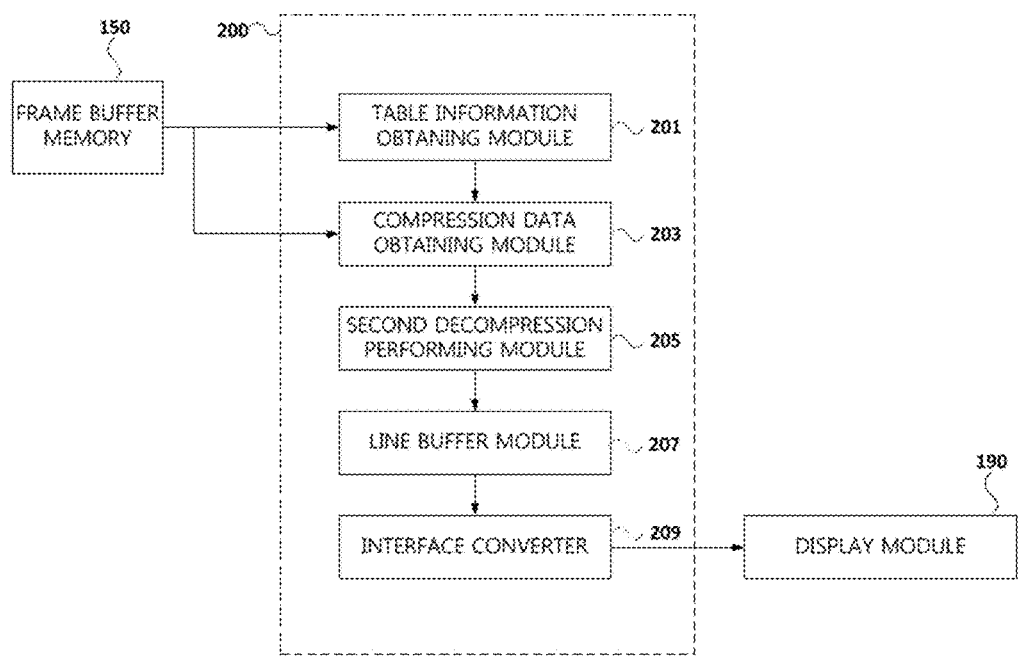
FIG. 10 is a view illustrating a converter of the video processing apparatus in detail according to an exemplary embodiment disclosed herein.

FIG. 10 is a view illustrating a converter of the video processing apparatus in detail according to an exemplary embodiment disclosed herein.

According to an embodiment of the present invention, the video processing apparatus may comprise a converter 200, as shown in FIG. 1. The converter 200 may perform decompressing the texture in the frame buffer memory 150 by using a different method with the decompression module 160, and output the texture in a linear way. In case of FIG. 2, the uncompression processing module 195 can be exist for transferring the texture, but in case of configuration as in the FIG. 1, the converter 200 can perform the decompression and output to the output module 190.

In an embodiment of the present invention, the output module 190 connected to the converter 200 may comprise a display interface, and when the output module 190 comprises a function of displaying, the output module 190 may be called as display module 190. The display module 190 may comprise at least one of a liquid crystal display (LCD), a thin film transistor-liquid crystal display (TFT LCD), an organic light-emitting diode (OLED), a flexible display, and a 3D display.

In particular, an output sequence of the converter 200 may have a raster sequence according to an interface format of the display module 190. Video signals having the raster order outputted from the converter 200 may be directly displayed by the output module 190 or other displays connected. Accordingly, although the present invention brings an effect for maintaining reduction of the bandwidth in case of the motion compensation by using the lossless compression of the frame buffer memory 150, it minimizes influences of video display speed of by outputting them through the converter 200 by using the frame buffer memory 150.

As shown in the FIG. 10, the converter may comprise a table information obtaining module 201, a compression data obtaining module 203, second decompression performing module 205, a line buffer module 207 and an interface converter 209, wherein the output module 190 can be called as display module 190 including display functions.

The table information obtaining module 201 obtains the lookup table information form the frame buffer memory 150.

The lookup table information, as mentioned above, may comprise compression information, group identification information and offset identification information generated in process of compressing and packaging by the compression module 140. The table information obtaining module 201, is different to in case of the compression module 160, may obtain lookup table information for each block sequentially started from the first group and the first offset, and transfer it to the compression data obtaining module 203.

Then, the compression data obtaining module 203 obtains each compressed block from the frame buffer memory 150 by using the obtained lookup table information.

The compression data obtaining module 203 may access to the frame buffer memory 150 by using the lookup table information of the compressed blocks sequentially indicated by the table information obtaining module 203, and may obtain compressed data of the texture blocks.

The second decompression performing module 205 performs decompression of the sequentially obtained blocks from the compression data obtaining module 203.

The second decompression performing module 205 may identify whether compression of the obtained block by using the lookup table information, and may perform decompression of the compressed blocks. Methods of decompression can be identical with decompression module 160, and variable-length decompression using one of code words can be used.

The line buffer module 207 temporarily stores the decompressed data, and output that line by line.

For example, the line buffer module 207 may store temporarily decompressed data in 16×4 units. The line buffer module 207 may include each of 4 line buffers for luma and chroma, and the temporarily stored data may be outputted in raster direction to the interface converter 209.

Figure 11:
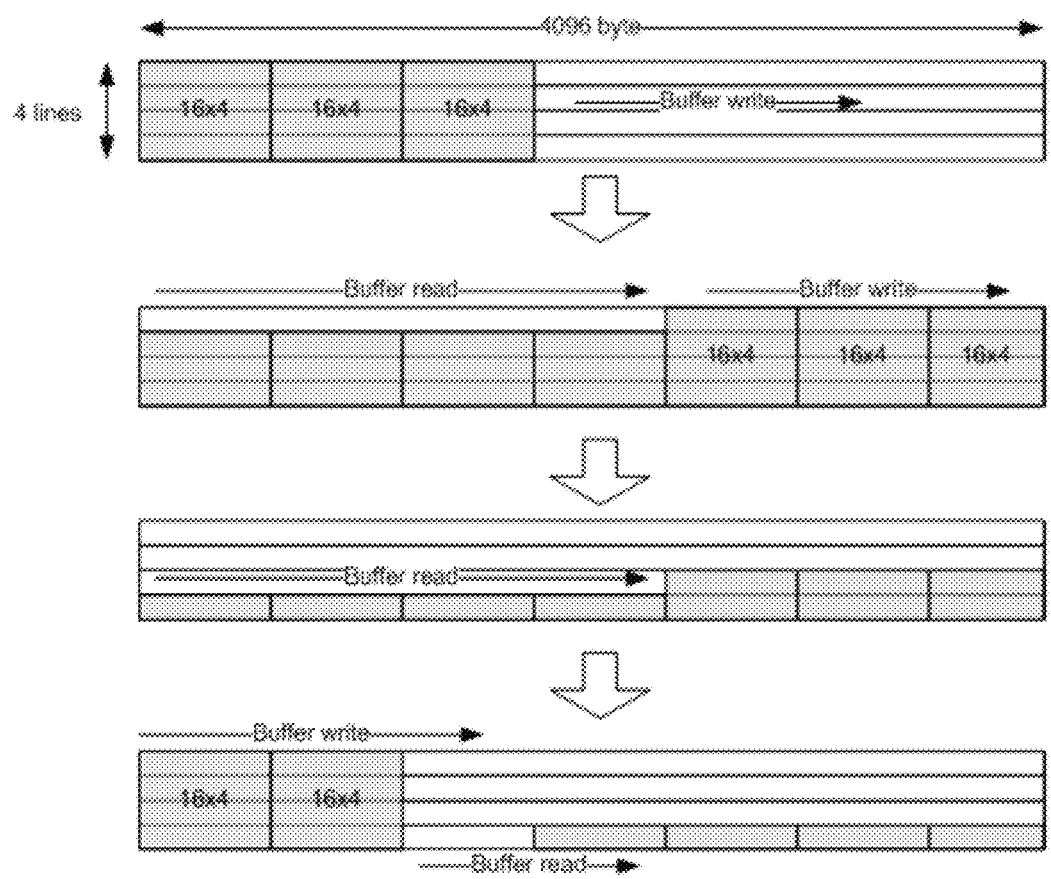
FIG. 11 is a view illustrating a line buffer module of the video processing apparatus in detail according to an exemplary embodiment disclosed herein.

FIG. 11 is a view illustrating a line buffer module of the video processing apparatus in detail according to an exemplary embodiment disclosed herein.

As shown in FIG. 11, the line buffer module 207 may perform sequentially temporal buffer writing and perform buffer reading in the raster direction.

For example, if the line buffer module 207 is capable of display interfacing in 4k size format, the line buffer module 207 may include 4 k×4 (=16 k) for luma and 2 k×4 (=8 k) for chroma, that is, 24 k bytes size of line buffer in total.

According to the present invention as shown in the FIG. 11, the line buffer module 207 may simultaneously read data in raster scan order during temporarily writing the blocks. It makes minimize the size of the line buffer by outputting naturally without a double buffer.

Here, FIG. 10 can be described again.

The interface converter 209 converts the data outputted from the line buffer module 207 in the raster scan order into an interface format which is proper to the display module 190. For example, if the decompressed data having 4:2:0 format, output format of the interface converter 209 may be 4:2:2 or 4:4:4.

Then, the display module 190 performs display based on the video signals from the interface converter 209.

Figure 12:
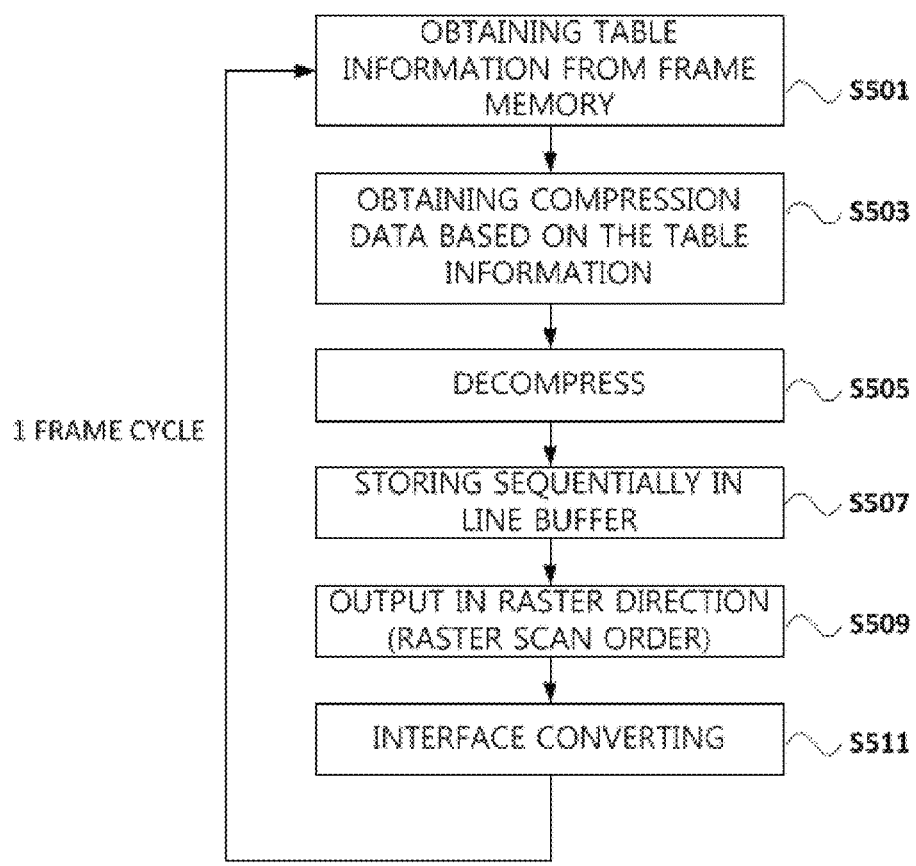
FIG. 12 is a flowchart for illustrating operations of the converter according to an exemplary embodiment of the present invention.

FIG. 12 is a flowchart for illustrating operations of the converter according to an exemplary embodiment of the present invention.

First, the converter 200 obtains table information from the frame buffer memory 150 (S501).

As described, the table information obtaining module 201 may obtain the lookup table information from the frame buffer memory 150. The lookup table information, as mentioned above, may comprise compression information, group identification information and offset identification information generated in process of compressing and packaging by the compression module 140.

And, the converter 200 obtains compression data based on the table information (S503).

As said above, the compression data obtaining module 203 may obtain each of the compressed blocks from the frame buffer memory 150 based on the obtained table information. The compression data obtaining module 203 may access to the frame buffer memory 150 by using the lookup table information of the compressed blocks sequentially indicated by the table information obtaining module 203, and may obtain compressed data of the texture blocks.

After that, the converter 200 performs decompression of the compressed data (S505).

The second decompression performing module 205 may perform decompression for the obtained blocks which are sequentially obtained by the compression data obtaining module 203. The second decompression performing module 205 may identify whether compression of the obtained blocks based on the lookup table information, and may perform decompression of compressed blocks. Descriptions of the decompression process are same as described above, and can be omitted.

Then, the converter 200 outputs stored block data in raster direction sequentially.

The line buffer module 207 may output block data sequentially stored in line buffers in raster direction. In this, the line buffer module 207 may temporarily store decompressed block data in the line buffers and may perform line output in raster direction in simultaneously. Therefore high output speeds can be maintained with small size of the line buffer.

And, the converter 200 performs interface converting (S511), output converted video signals to display module 190.

The interface converter 209 may convert texture images outputted from the line buffer module 207 into a video display format according to interface properties of the display module 190.

Then, the display module 190 can control display based on the converted video signals.

Figure 13:
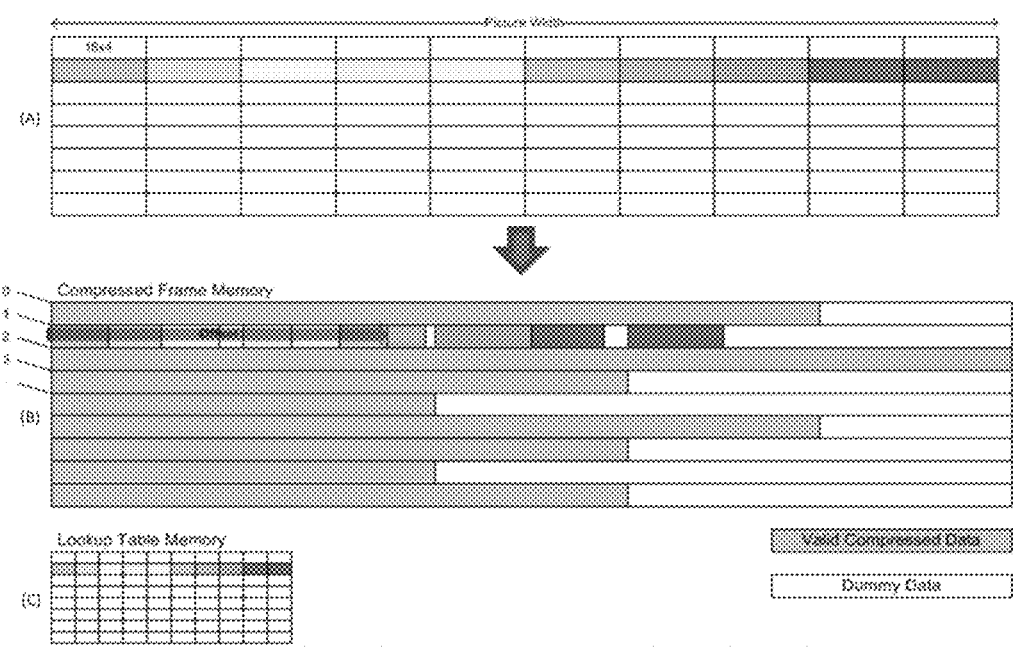
FIG. 13 is a view illustrating a frame buffer memory compressed according to an exemplary embodiment disclosed herein.
Figure 14:
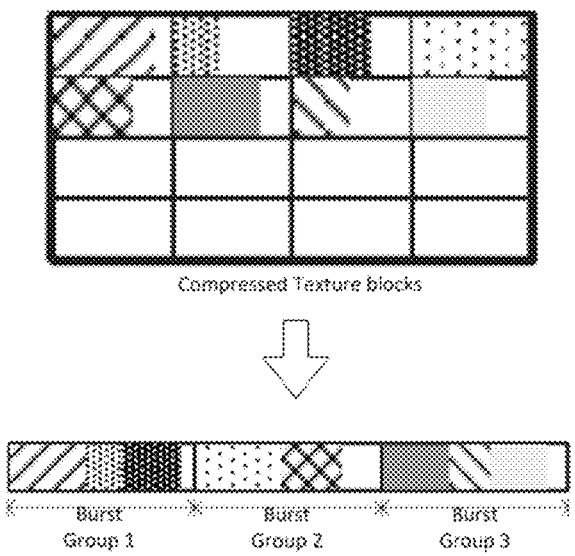
FIG. 14 is a view illustrating a compression method and grouping in accordance with an exemplary embodiment disclosed herein.

FIGS. 13 to 14 are views illustrating a configuration of the divided and packaged blocks according to an exemplary embodiment of the present invention.

(A) of FIG. 13 illustrates a whole frame divided into blocks. As illustrated in (A) of FIG. 13, each frame may be divided into blocks each having a preset size. The preset size may be variable. 16×4 block is assumed in the embodiment disclosed herein. If a size of a picture is not a multiple of the preset size, an extra value of a block corresponding to an edge may be set to the same value as an edge pixel.

Meanwhile, as illustrated in FIG. 14, each of the divided blocks may be selectively compressed. Here, a compression method, as aforementioned, may be selected from one of uncompression, and variable-length coding compression using DPCM, on the basis of reduction or non-reduction of bandwidths.

Each compressed block may be packaged into each group according to a burst length. The packaging module 144 in this embodiment disclosed herein, as illustrated in a bottom of FIG. 14, may package the blocks by designating burst groups, respectively. A size of each burst group may correspond to a burst length of the frame buffer memory 150, and a group identifier may be assigned to each group.

Figure 15:
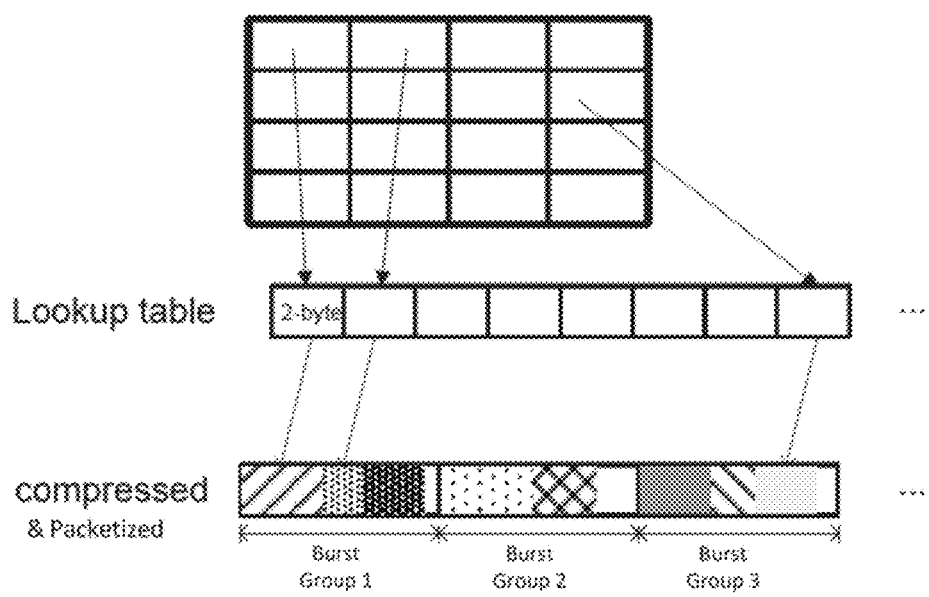
FIG. 15 is a view illustrating a lookup table in accordance with an exemplary embodiment disclosed herein.

Also, the packaging unit 144, as illustrated in FIG. 15, generates lookup table information corresponding to each block. The lookup table information may include information for identifying each divided block and a compressed or uncompressed state thereof from the packaged data. For example, the lookup table information may include 2-byte data containing 8-bit group identifier information, 7-bit start offset information and 1-bit compression flag. The lookup table information may be stored separately in the frame buffer memory 150.

Referring back to FIG. 13, (B) of FIG. 13 illustrates a storage space of the frame buffer memory 150 in which the packaged data is recorded in a sequential manner. As compared with the whole frame of (A) of FIG. 13, the whole frame of (B) of FIG. 13 can store the compressed texture data by each block.

Here, numbers 0, 1, 2 and 3 at the left of the drawing may indicate base addresses corresponding to burst groups, respectively. Each block may be identified according to burst group identification information and an offset value. A region in which no texture data is present in each burst group may be filled with dummy data.

Meanwhile, (C) of FIG. 13 illustrates lookup table information which is stored separately in the frame buffer memory 150. The lookup table information may be filled with 2-byte values corresponding to respective blocks, and arranged in the order of blocks constructing the whole frame.

Therefore, the decompression module 160 may receive only the lookup table information, as illustrated in (C) of FIG. 13, to identify texture blocks from the frame buffer memory 150, and can reconstruct an original frame by performing decompression and reconstruction for the blocks.

Also, as aforementioned, the transmission and reception of only the lookup table information may result in a reduction of overhead caused due to transmission and reception of every memory address. Consequently, improvement of data processing efficiency and reduction of bandwidths can be acquired.

Figures 16, 17:
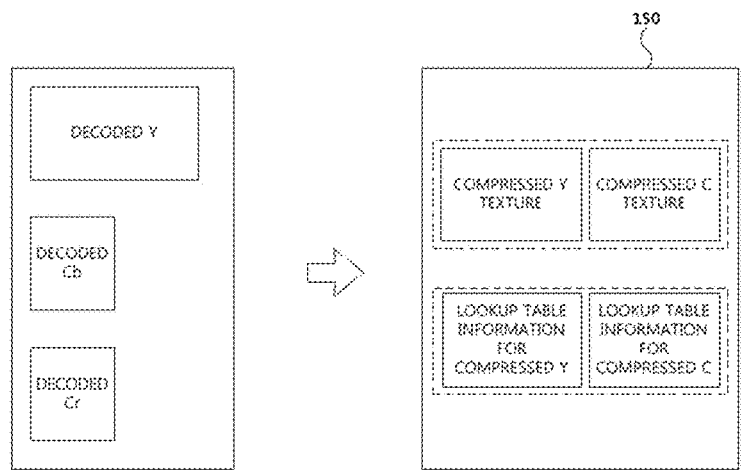
FIG. 16 is a view comparing information stored in a frame buffer memory according to an exemplary embodiment disclosed herein with the related art configuration.
FIGS. 17 to 24 are experimental data illustrating improved processing efficiency in case of applying an exemplary embodiment of the present invention.

FIG. 16 is a view illustrating a size variation of the frame buffer memory 150 according to an exemplary embodiment of the present invention, which illustrates a configuration of the frame buffer memory 150 for reducing bandwidths.

A left block diagram illustrates a typical frame buffer, and a right block diagram illustrates the frame buffer memory 150 which is compressed and packaged according to the exemplary embodiment of the present invention. As illustrated in FIG. 16, unlike the related art frame buffer which stores decoded Y, Cb and Cr values, the frame buffer memory 150 according to the exemplary embodiment of the present invention may include compressed Y texture data, compressed C texture data, lookup table information relating to the compressed Y, and lookup table information relating to the compressed C.

The frame buffer memory 150 according to the exemplary embodiment of the present invention may include a buffer for storing the lookup table information. A size of the buffer may be decided depending on an image frame size. For example, when 2-byte lookup table information is generated for a block of 16×4 pixels, a buffer size for lookup table information may be decided as ⅟₃₂*(frame size) for one frame. Therefore, the frame buffer memory 150 according to the embodiment of the present invention may further include an additional buffer region as compared with the conventional frame buffer.

Also, when the 2-byte lookup table information is generated for the block of 16×4 pixels, a region-based buffer size of the frame buffer memory 150 may be derived by the following formulas.

Compressed data for Luma:(PicX+15)/16*16*PicY

Compressed data for Chroma:(PicX/2+15)/ 16*16*PicY

Lookup table for Luma:(PicY+15)/16*(PicX+255)/ 256*128

Lookup table for Chroma:(PicY+15)/16*(PicX/2+ 255)/256*128

Description will be back to FIG. 4.

Afterwards, the video processing apparatus 100 transfers the lookup table information and the packaged data to the decompression module 160 according to the reference frame request of the motion compensation module 170 (S180).

The decompression module 160 of the video processing apparatus 100 randomly accesses blocks constructing the corresponding frame using the lookup table information, and performs decompression of the blocks and frame reconstruction, thereby obtaining the reference frame (S190).

The video processing apparatus 100 transfers the obtained reference frame to the motion compensation module 170 (S195).

FIGS. 17 to 24 illustrate test data indicating results obtained by applying the video processing method in accordance with the exemplary embodiment of the present invention.

To test the bandwidth reduction effect of the video processing method according to the embodiment disclosed herein, various HEVC test sequences were used and classified into A to F according to image sizes. Bandwidths were estimated as a total amount of frame data in which reading/writing of a memory was performed through a 128-bit bus interface during a decoding process (while reading/writing of the reference frame was performed for motion compensation). Also, four different qp values (22, 27, 32 and 37) for each sequence were used.

Considering the whole results of FIGS. 17 to 24, it was understood that the video processing method according to the exemplary embodiment disclosed herein could save 56% of bandwidths on average rather than pure bandwidths when a loop filter module performs writing. Also, it was understood that the video processing method according to the exemplary embodiment of the present invention could save 59% of bandwidths on average rather than pure bandwidths when a motion compensation module performs writing.

Figures 18, 19:
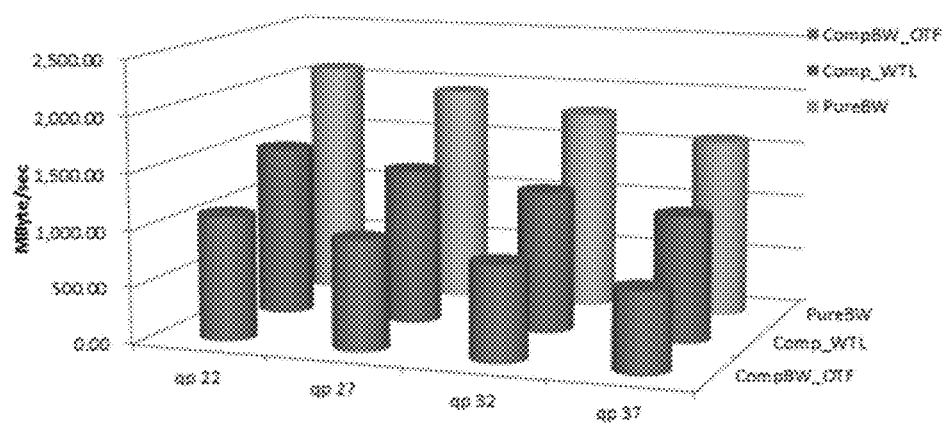

FIGS. 17 and 18 illustrate compensation results in a classifying manner of average bandwidths due to a frame buffer compression of the video processing method according to the embodiment disclosed herein and pure bandwidths without compression performed.

FIG. 17 illustrates a bandwidth reduction rate when the decoding apparatus illustrated in FIG. 1 processes a video in accordance with one exemplary embodiment of the present invention, and FIG. 18 illustrates a bandwidth reduction rate when the decoding apparatus illustrated in FIG. 2 processes a video in accordance with another exemplary embodiment of the present invention.

Figure 20:
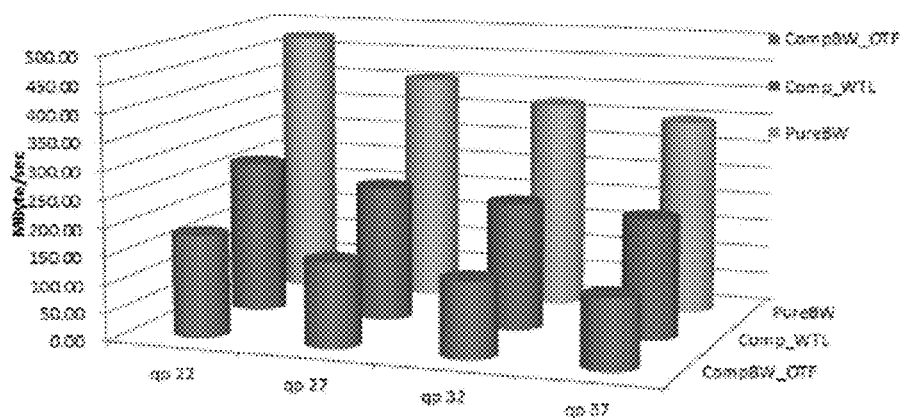
Figure 21:
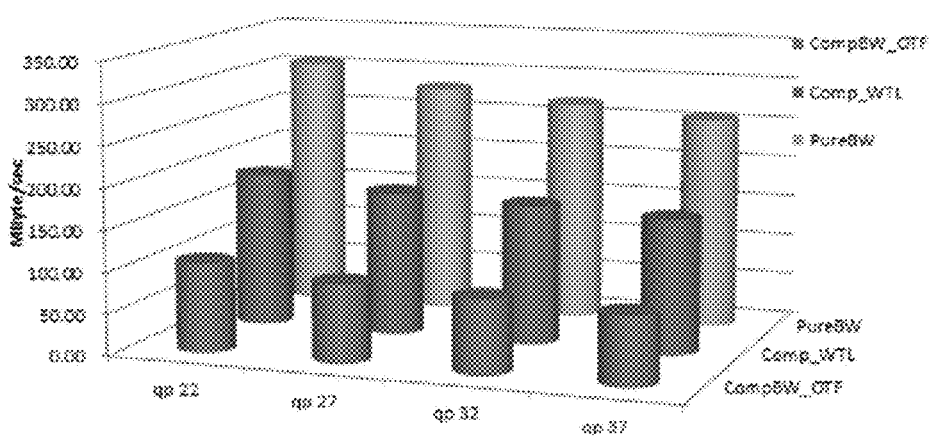
Figure 22:
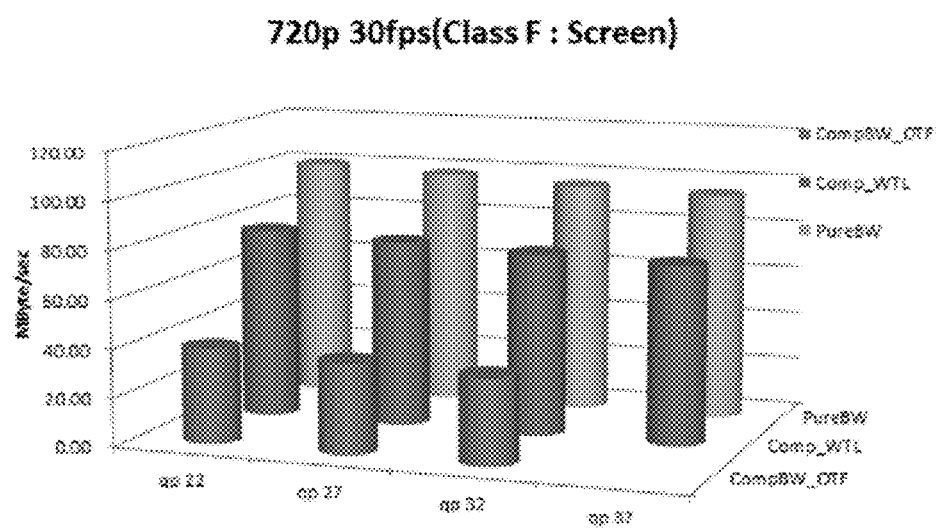

Meanwhile, FIGS. 19 to 21 are graphs visually illustrating comparison results according to each condition as FIGS. 17 to 18. As can be understood through the graphs, a remarkable bandwidth reduction can be obtained according to the embodiment of the present invention.

Figure 23:
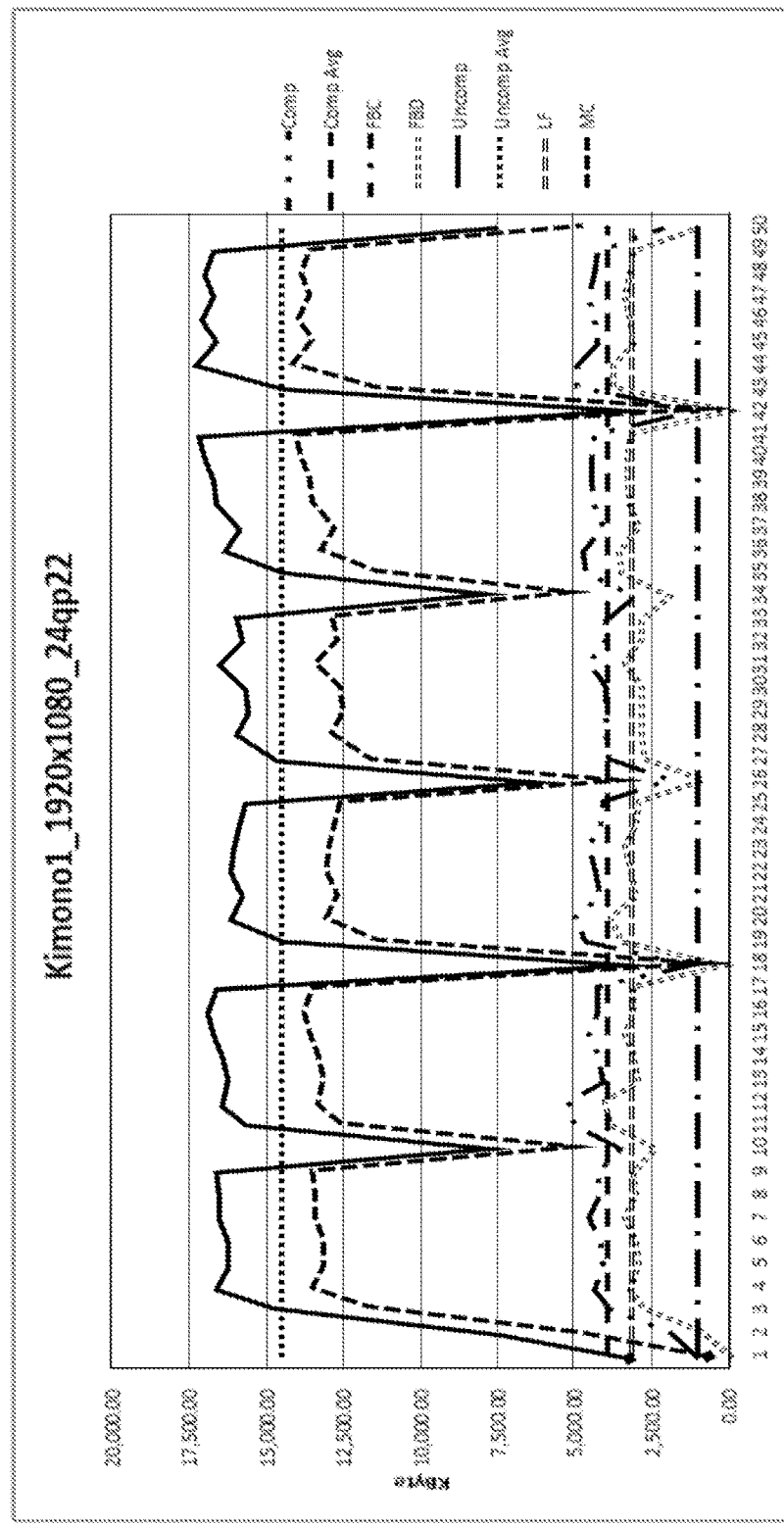

FIG. 23 also illustrates maintenance of bandwidth stability as well as the bandwidth reduction according to the video processing method according to the exemplary embodiment of the present invention. With regard to results of the frame buffer compression (line marked with FBC) according to the embodiment of the present invention in FIG. 19, it can be understood that an almost uniform value is maintained in spite of the drastic change of uncompressed image information while about 70% of bandwidths is reduced rather than uncompression (Uncomp). Therefore, the present invention can maintain bandwidth stability and derive an advantageous result for cache design.

Figure 24:
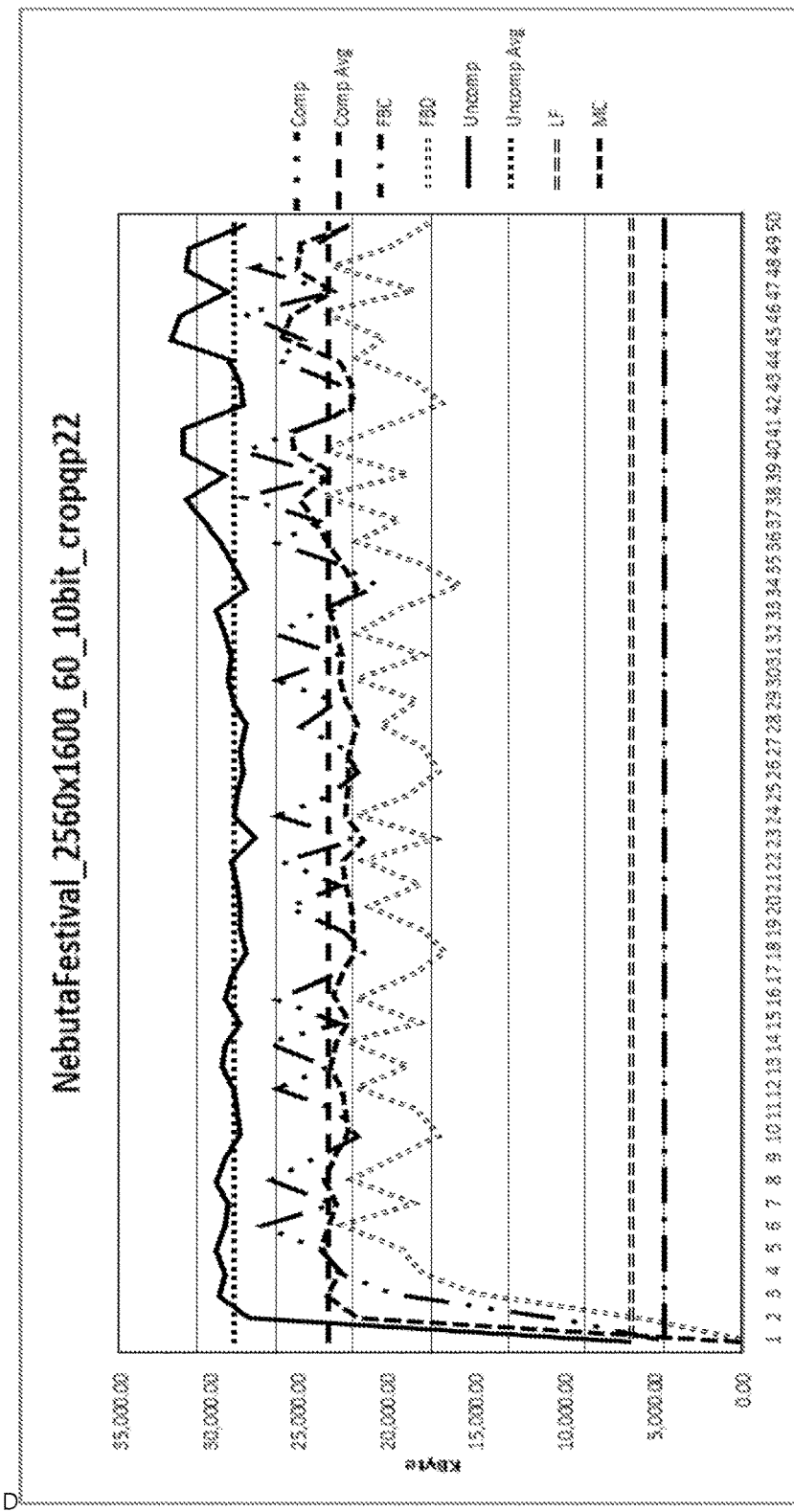

FIG. 24 illustrates that an average bandwidth upon the frame buffer compression (line marked with FBC) is reduced below 20% rather than a bandwidth of uncompressed (Uncomp) data. The embodiment according to the present invention can allow for processing high-resolution image while maintaining image quality by virtue of the bandwidth reduction.

The aforementioned methods according to the present invention can be written as computer programs to be implemented in a computer and be recorded in a computer readable recording medium. Examples of the computer readable recording medium include read-only memory (ROM), random-access memory (RAM), CD-ROMs, magnetic tapes, floppy disks, optical data storage devices, and carrier waves, such as data transmission through the Internet.

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While exemplary embodiments of the present invention have been shown and described, the present invention is not limited to the described exemplary embodiments. Instead, it would be appreciated by those skilled in the art that various changes and modifications may be made to these exemplary embodiments without departing from the spirit and scope of the invention as defined by the appended claims, and these changes and modifications are not construed as being separated from the technical idea and prospects of the present invention.

The invention claimed is:

1. A video processing apparatus for processing motion compensation of a plurality of frames, the video processing apparatus comprising:
    an image receiver receiving encoded data;
    a filter filtering an image frame reconstructed from the encoded data;
    a block divider dividing a reference frame into a plurality of blocks in a predetermined block dividing unit, wherein the reference frame is obtained from the image frame and is transmitted to process the motion compensation module of the plurality of frames;
    a compression processor selectively compressing each of the plurality of blocks, which is received from the block divider, in a lossless compression manner on a basis of reduction or non-reduction of bandwidths with respect to a frame buffer memory that contains the reference frame, —packaging the plurality of blocks in a unit of a burst group, wherein a size of the burst group corresponds to a burst length of the frame buffer memory, and generating lookup table information corresponding to each of the plurality of blocks;

the frame buffer memory recording the plurality of blocks, which is packaged, and the lookup table information, and providing the reference frame for the motion compensation by using the plurality of blocks and the lookup table information;

a first decompression processor performing a random access first decompression to one or more of the plurality of blocks corresponding to a particular frame for the motion compensation by using the lookup table information;

a converter sequentially decompressing and outputting the plurality of blocks in a different manner from the first decompression processor by using the lookup table information, a second decompression processor sequentially decompressing the plurality of blocks; and a line buffer temporarily storing the plurality of blocks, which is sequentially decompressed and outputting the same in a raster direction, wherein the first decompression processor manages the lookup table information by a cache memory.

2. The apparatus of claim 1, wherein the converter obtains the lookup table information from the frame buffer memory, and sequentially gains the plurality of blocks based on the lookup table information, wherein the lookup table information includes compression information, group identification information and offset information corresponding to each of the plurality of blocks.

3. The apparatus of claim 1, wherein the line buffer temporarily and sequentially stores the plurality of blocks, and outputs the plurality of blocks in the raster direction simultaneously.

4. The apparatus of claim 1, the converter comprising:

an interface converter converting outputted decompressed data into an interface format for displaying.

5. The apparatus of claim 4, further comprising:

a display controlling a display panel based on output data of the interface converter.

6. The apparatus of claim 1, wherein the compression processor performs compression or bypass for each of the plurality of the blocks using a plurality of code words different from each other according to each property of the plurality of blocks.

7. A video processing method for processing motion compensation of a plurality of frames, the method comprising:

receiving an encoded image;

filtering an image frame reconstructed from the encoded image;

dividing a reference frame into a plurality of blocks in a predetermined block dividing unit;

selectively compressing each of the plurality of blocks in a lossless compression manner on a basis of reduction or non-reduction of bandwidths with respect to a frame buffer memory that contains the reference frame;

packaging the plurality of blocks into in a unit of a burst group, wherein a size of the burst group corresponds to a burst length of the frame buffer memory;

generating lookup table information corresponding to each of the plurality of blocks;

recording the plurality of blocks, which is packaged, and the lookup table information;

providing the reference frame for the motion compensation by using the plurality of blocks and the lookup table information;

performing a random access first decompression to one or more of the plurality of blocks corresponding to a particular frame for the motion compensation by using the lookup table information; and sequentially performing second decompression to the plurality of blocks by using the lookup table information, wherein the step of the second decompression comprises:
sequentially decompressing the recorded blocks;
temporarily storing the plurality of blocks, which is sequentially decompressed; and
outputting the same in raster scan order, and wherein the step of the first decompression comprises managing the lookup table information by using a cache memory.

8. The method of claim 7, the step of the performing second decompression comprising:

obtaining the lookup table information from the frame buffer memory; and sequentially obtaining the plurality of blocks based on the lookup table information, wherein the lookup table information comprises compression information, group identification information, and offset information corresponding to each of the plurality of blocks.

9. The method of claim 7, the step of the outputting comprising:

temporarily and sequentially storing the plurality of blocks and outputting the plurality of blocks, which are temporarily prestored, in raster scan order simultaneously.

10. The method of claim 7, the step of the second decompression comprising:

converting outputted decompressed data into an interface format for displaying.

11. The method of claim 10, further comprising:

controlling display based on the converted data from interface converter.

12. The method of claim 7, the step of the compressing comprising:

performing compression or bypass for each of the plurality of the blocks using a plurality of code words different from each other according to each property of the plurality of blocks.

13. A non-transitory computer readable medium storing a program causing a computer to execute a video processing method, the video processing method for processing motion compensation of a plurality of frames comprising:

receiving an encoded image;

filtering an image frame reconstructed from the encoded image;

dividing a reference frame into a plurality of blocks in a predetermined block dividing unit;

selectively compressing each of the plurality of blocks in a lossless compression manner on a basis of reduction or non-reduction of bandwidths with respect to a frame buffer memory that contains the reference frame;

packaging the plurality of blocks into in a unit of a burst group, wherein a size of the burst group corresponds to a burst length of the frame buffer memory;
generating lookup table information corresponding to each of the plurality of blocks;
recording the plurality of blocks, which is packaged, and the lookup table information;
providing the reference frame for the motion compensation by using the plurality of blocks and the lookup table information;
performing a random access first decompression to one or more of the plurality of blocks corresponding to a particular frame for the motion compensation by using the lookup table information; and
sequentially performing second decompression to the plurality of blocks by using the lookup table information,
wherein the step of the second decompression comprises:
sequentially decompressing the recorded blocks;
temporarily storing the plurality of blocks, which is sequentially decompressed; and
outputting the same in raster scan order, and
wherein the step of the first decompression comprises managing the lookup table information by using a cache memory.

14. The non-transitory computer readable medium of claim 13, the step of the performing second decompression comprising:
obtaining the lookup table information from the frame buffer memory; and
sequentially obtaining the plurality of blocks based on the lookup table information,
wherein the lookup table information comprises compression information, group identification information, and offset information corresponding to each of the plurality of blocks.

* * * * *